(12) United States Patent
Daun

(10) Patent No.: US 11,629,547 B2
(45) Date of Patent: Apr. 18, 2023

(54) DEVICE AND METHOD FOR CONNECTING PROFILED PARTS

(71) Applicant: Rotox Besitz—und Verwaltungsgesellschaft MbH, Brechen (DE)

(72) Inventor: Winfried Daun, Grenderich (DE)

(73) Assignee: Rotox Holding GmbH & Co. KG, Brechen (DE)

( * ) Notice: Subject to any disclaimer, the term of this patent is extended or adjusted under 35 U.S.C. 154(b) by 450 days.

(21) Appl. No.: 16/764,205

(22) PCT Filed: Nov. 21, 2018

(86) PCT No.: PCT/EP2018/082060
§ 371 (c)(1),
(2) Date: May 14, 2020

(87) PCT Pub. No.: WO2019/101787
PCT Pub. Date: May 31, 2019

(65) Prior Publication Data
US 2020/0386041 A1    Dec. 10, 2020

(30) Foreign Application Priority Data

Nov. 21, 2017 (DE) .......................... 102017127483.9

(51) Int. Cl.
*E06B 3/00*        (2006.01)
*B29C 65/00*       (2006.01)
(Continued)

(52) U.S. Cl.
CPC ............ *E06B 3/9608* (2013.01); *B29C 65/18* (2013.01); *E06B 3/22* (2013.01)

(58) Field of Classification Search
CPC ..... E06B 3/00; E06B 3/20; E06B 3/22; E06B 3/90; E06B 3/96; E06B 3/9608; B29C 65/00; B29C 65/10; B29C 65/18
See application file for complete search history.

(56) References Cited

U.S. PATENT DOCUMENTS 4,239,574 A    12/1980 Aust
9,364,994 B2 *  6/2016 Vaccari ............. B29C 66/52431
(Continued)

FOREIGN PATENT DOCUMENTS

CA        2945712 A1    4/2017
DE    102012112533 A1   7/2013
(Continued)

*Primary Examiner* — Jacob T Minskey
*Assistant Examiner* — Matthew Hoover
(74) *Attorney, Agent, or Firm* — Rogowski Law LLC

(57) ABSTRACT

At least two profiled parts (1) are fixed to profile supports (2) that can be moved relative to each other. The profiled parts (1) are each partially melted at an end joining face (10) with a heating element (5) in a melting step and, after the heating element (5) has been removed, the partially melted joining faces (10) of the profiled parts are pressed against each other in a joining step, until the molten materials brought into contact with each other there cool down and solidify, forming a welded connection. To avoid or reduce occurrence or development of a welding bead, in a separating step that is carried out before the joining step, a mating tool (6, 29) is guided through the melt along the separating edge (9) of the limiting element (3), in order to separate the excess melt (7) that has escaped over the separating edge (9).

26 Claims, 21 Drawing Sheets

(51) Int. Cl.
    *E06B 3/96*         (2006.01)
    *E06B 3/22*         (2006.01)
    *B29C 65/18*      (2006.01)

(56) References Cited

U.S. PATENT DOCUMENTS

| | | |
|---|---|---|
| 9,969,124 B2 | 5/2018 | Vaccari |
| 10,479,026 B2 | 11/2019 | Daun |
| 2004/0055434 A1 | 3/2004 | Cupp |
| 2006/0065358 A1 | 3/2006 | Cupp |
| 2018/0111330 A1* | 4/2018 | Schmittinger .... B29C 66/72523 |
| 2018/0339462 A1* | 11/2018 | Wagner .............. B29C 65/7841 |

FOREIGN PATENT DOCUMENTS

| | | |
|---|---|---|
| DE | 202015000908 U1 | 4/2015 |
| DE | 202015107121 A1 | 1/2016 |
| DE | 102015107121 A1 | 11/2016 |
| DE | 102015013439 A1 | 4/2017 |
| DE | 102016102240 A1 | 8/2017 |
| DE | 102016104785 A1 | 9/2017 |
| EP | 2255942 A1 | 1/2010 |
| WO | 2016177715 A1 | 11/2016 |
| WO | 2017137467 A1 | 8/2017 |
| WO | 2017157914 A1 | 9/2017 |

\* cited by examiner

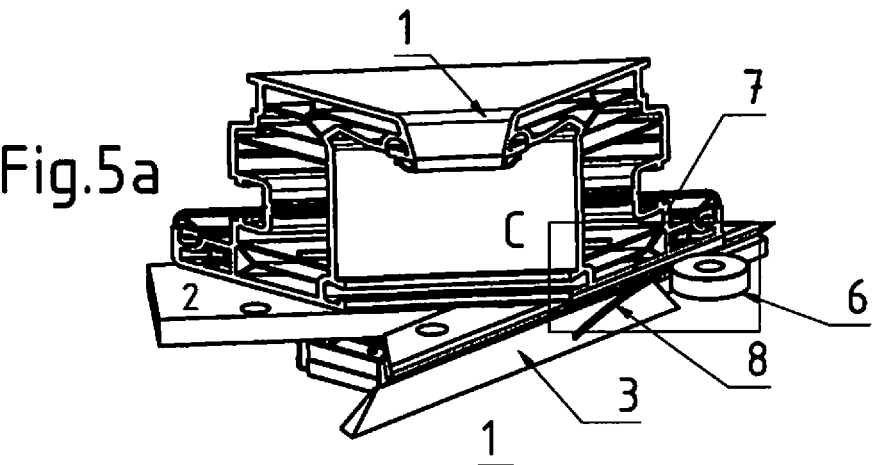
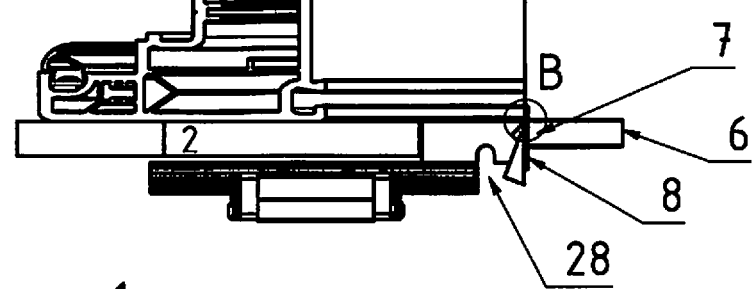
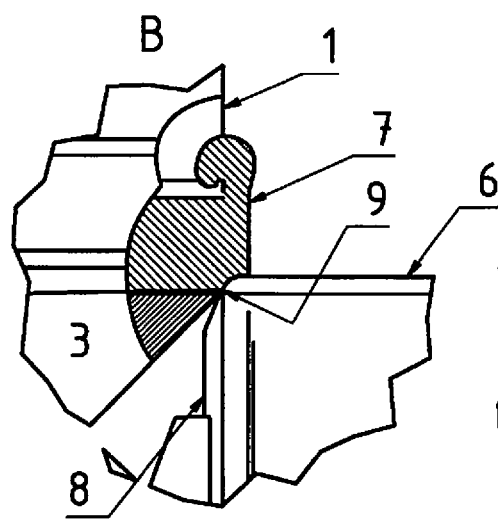
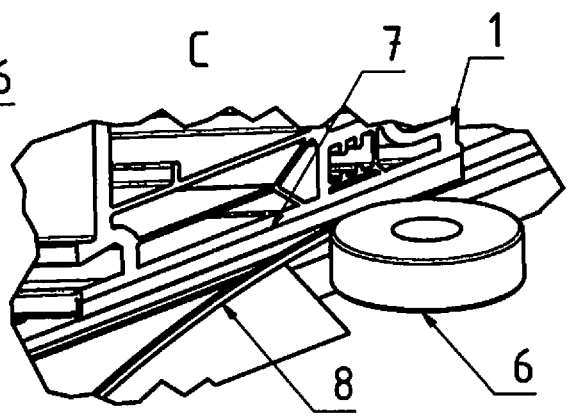

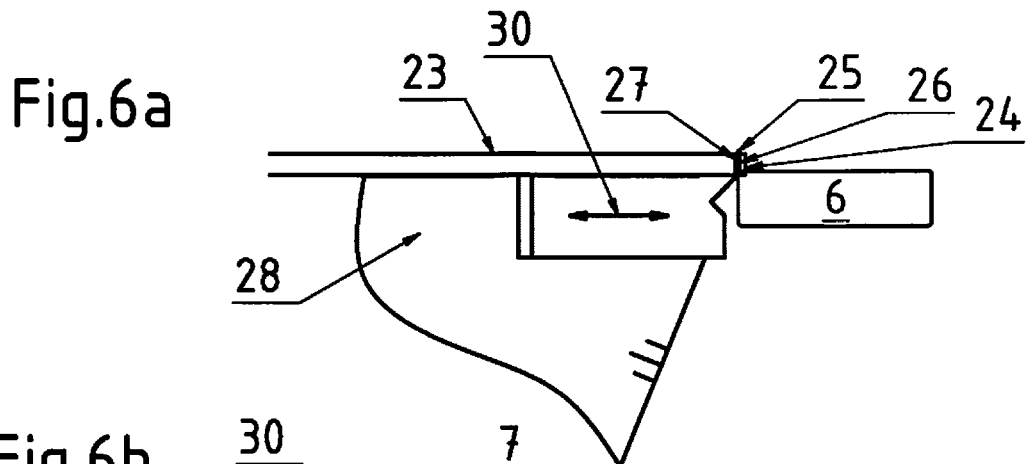
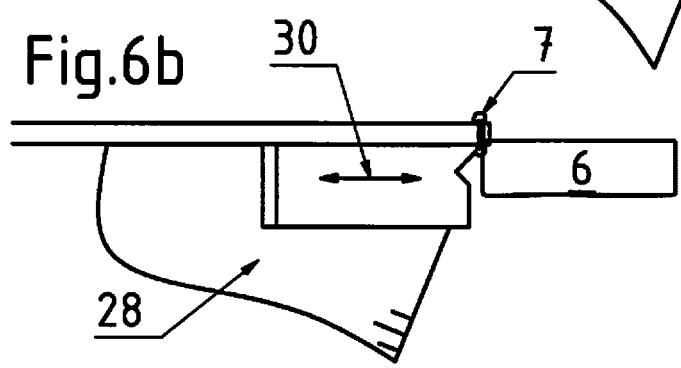
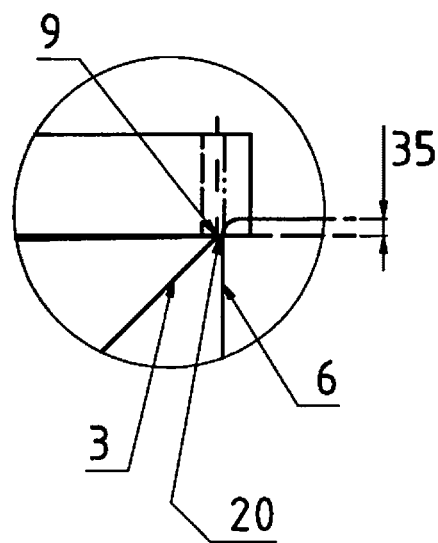
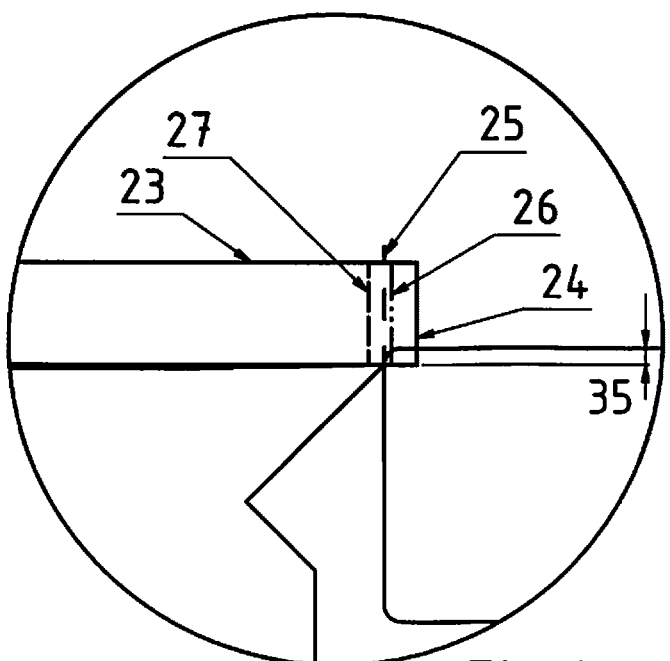

DEVICE AND METHOD FOR CONNECTING PROFILED PARTS

CROSS-REFERENCE TO RELATED APPLICATIONS

This application is a national stage application (under 35 USC § 371) of PCT/EP2018/082060, filed Nov. 21, 2018, which claims benefit of German application No. 10 2017 127 483.9, filed Nov. 21, 2017, the contents of each of which are incorporated by reference herein.

BACKGROUND OF THE INVENTION

Technical Field and State of the Art

The invention relates to a method for connecting profiled parts according to the generic part of claim 1 as well as to a device for connecting profiled parts according to the generic part of claim 15.

Methods and devices of the above-mentioned type are disclosed, for example, in German patent application DE 10 2015 107 121 A1 and are especially used to weld PVC profile bars onto workpieces in the form of window frames or door frames or of window casements or door leaves. For this purpose, the profile bars are each cut to the requisite length prior to the welding procedure so that the cut surfaces that form the joining faces can be subsequently connected to each other by means of welding. If necessary, the profiled parts can be mitered so that the mitered surfaces form the joining faces.

As set forth in the present invention, the actual welding of the profiled parts is carried out by partially melting and subsequently joining the joining faces at the ends of the profile bars. For this purpose, the profiled parts that are to be welded are first placed into an appropriate clamping device and then positioned relative to each other in the device with the assistance of stops and guides. Subsequently, in a partial melting step, the joining faces are pressed against the heating surface of a heating element of the welding device. During the heating and alignment steps that take place in this process, the material of each profiled part melts at its joining face so as to form the melt, namely, material that has become liquid or pasty due to the effect of heat and that is needed for the welded connection. Any irregularities that might be present on the joining faces are also melted off when the joining face is pressed against the heating element, the so-called alignment step.

During the repositioning step that follows, the heating element that is between the profiled parts is removed before they are joined together. They are joined in that the two profiled parts are brought into contact and compressed, a process in which the partially melted joining faces are moved towards each other in the joining direction and pressed against each other. In this process, the still-hot, preferably thermoplastic, material of the two profiled parts, namely the melt, comes into contact and, after cooling off, forms a sturdy welded connection. Such a procedure is described, for example, in German patent application DE 10 2012 112 533 A1.

The two pieces to be joined are themselves longer by a given excess length than the later final dimensions of the connected elements of the workpiece. In order to form the melt, part of this excess, the so-called burn-off, is melted off at the heating element. Another portion of the excess softens during the partial melting step and is compressed to the prescribed finished size in the subsequent joining step. The ratio of the excess length to the melting off and the compression is variable. Depending on the type of profile employed, the burn-off can be greater or smaller so that there is always sufficient melt to ensure a reliable welded connection.

During the partial melting step at the heating element, the material of the profiled part, for instance, PVC, starts to flow and to be shaped at the joining face. In this process, the melt, which is displaced when the profiled part is pressed against the heating plate, also moves sideways to the outside over the rim of the joining face all the way to the outer surfaces, especially onto the exposed surfaces of the profiled part.

The exposed surfaces of the profiled part are the outer surfaces that are visible when the workpiece is finished and has been installed. When it comes to windows and doors, these are the surfaces of the individual profiled parts that are visible in the plane of the window or door. Fastening elements, for instance, fittings or other workpiece elements such as, for example, window panes, can be placed on and fastened to the functional surfaces of the profiled parts that usually extend crosswise or perpendicular to the exposed surfaces.

In the prior-art connecting methods, the material of the profiled parts that escapes to the outside as excess melt during the joining procedure cools off and forms a weld bead at the connecting site of the profiled part. Such a weld bead on the outer surfaces of the profiled part, particularly on the exposed surfaces, however, has a detrimental effect on the dimensional stability of the workpiece as well as on its esthetic appearance. For this reason, after a certain cooling-off time, the weld bead is removed in downstream machines such as, for instance, trimming machines, for example, by milling shadow grooves or by making a flush cut-off along the weld.

In the meantime, film-coated or laminated profiles are also employed to manufacture window frames and door frames or window casements and door leaves in order to easily give them various colors or decors. The requisite finishing of the weld beads in the joining area of such profiles is difficult since the thin films or laminate layers can easily be damaged by mechanical processing. Especially in the case of automated or partially automated processes, this can give rise to a greater number of costly rejects. The removal of the weld bead exposes the underlying base material of the profiled part whose color differs from that of the film or laminate, and the base material then has to be manually laminated with the appropriate color.

For some years now, efforts have been aimed at achieving an ideal manufacturing technique with which the welding of profiled parts, especially those with a décor, would yield visually attractive exposed surfaces and which would not create a weld seam that would then have to be deburred and/or re-painted.

Problem-solving approaches of the recent state of the art are aimed at preventing the formation of a weld bead from the outset in that the flow of the melt before and/or during the joining procedure is systematically influenced. For instance, the profiled part in question can be constricted by means of limiting elements such as, for example, restriction knives, in order to reduce or prevent melt from escaping. This is proposed, for example, in German utility model DE 20 2015 000 908 U1 as well as in German patent applications DE 10 2015 107 121 A1, DE 10 2016 102 240 A1 and DE 10 2016 104 785 A1. Some of the devices in these publications have mold parts that can be moved before and/or during the partial melting step in order to influence the melt. This is meant to either prevent the melt from escaping to the outside and/or to move any melt that has already escaped back to or onto the joining face of the profiled part in question so that a weld bead is not even formed at all during the subsequent joining procedure.

A new problem that occurs in this context has to do with the impurities in the melt stemming from melted material of the protective films. These films are situated on the exposed surfaces of the profiled parts and they serve as protection against transportation damage as well as against the effect of construction materials, and they are removed on site in an additional work step before the partial melting step.

In spite of these additional measures, however, a gap through which the melt can flow often remains between the appertaining limiting element and the profiled part, so that it is not always possible to reliably prevent a weld bead from being formed. For this reason, any weld beads that might have been formed still have to be removed in an additional work step after the profiled parts have cooled off. As a consequence, the production effort and the manufacturing costs cannot be reduced to the desired extent.

European patent application EP 2 255 942 A1 proposes that the limiting elements be simultaneously configured as movable cutting blades. During the joining step, in which the partially melted joining faces of the profiled parts have already been pressed against each other, a process in which they are compressed, these cutting blades alternatingly execute a back-and-forth movement towards the profiled part in order to taper the weld bead at its root before it has completely cooled off and has not yet solidified. After the weld bead has cooled off completely and solidified, another relative movement of the cutting blades is executed in order to completely remove the weld bead. This process, however, shifts the task of removing the weld bead to the welding machine and did not turn out to be technically feasible.

As an alternative suggestion for preventing weld bead formation, international patent applications WO 2013/132406 A1 and WO 2014/122572 A1 propose that the profile material at the rim of the joining face be removed prior to the partial melting so that the amount of material available to create the melt is already reduced from the very start. As a result, the melt should no longer escape onto the outer surfaces of the profiled parts. This, however, could translate into a loss of strength at the connection since the profiled part is not yet completely melted at its joining face and, due to the resulting smaller effective cross-sectional surface area, it is not welded over its entire surface area.

Before this backdrop, the invention is based on the objective of putting forward a method and a device with which the formation of a weld bead can be reliably avoided, or its extent can be reduced.

SUMMARY OF THE INVENTION

Accordingly, a method for connecting at least two profiled parts is being put forward according to the invention, especially for the manufacture of door frames or window frames or of door leaves or window casements made of a thermoplastic material, whereby the at least two profiled parts, which are secured to profile supports that can be moved relative to each other, are each partially melted at their end joining faces during a partial melting step employing a heating element. Once the heating element has been removed, the partially melted joining faces of the profiled parts are pressed against each other in a joining step until the melt that has been brought into contact there has then cooled off and solidified, thereby creating the welded connection. Here, a limiting element with a separating edge rests on and/or against at least one outer surface of at least one profiled part. During the partial melting step, the limiting element controls and/or limits excess melt at the transition of the appertaining joining face from escaping towards the outer surface, especially towards the exposed surface, of the profiled part. According to the invention, it is provided that, in a segregation step before the joining step, a counter tool is guided through the melt along the separating edge of the limiting element in order to segregate the excess melt that has escaped over the separating edge.

The term "partial melting step" refers to the action of pressing the profiled part against the heating element, for example, a heating plate, whereby the material of the profiled part located on the joining face is partially melted or melted off when it is heated up.

In this process, the profiled part is shortened by the so-called burn-off, in other words, the material of the profiled part that is becoming liquid or pasty and that is escaping to the side due to the effect of the contact pressure. Since the joining face of the profiled part is pressed against the usually flat heating element, any irregularities that might be present on the joining face of the profiled part are leveled or even smoothed out. In the areas where a limiting element rests against and/or on the outer surface of the profiled part, the melt that is escaping to the side travels over the separating edge, where it cools off more quickly than on the joining face.

This portion of the melt that is not needed to make the welded connection is referred to as the excess melt.

The outer surface can preferably be at least one exposed surface and/or functional surface of the profiled part.

In the case of colored film-coated or laminated profiled parts, the excess melt that escapes, especially at the exposed surfaces, contains not only the base material of the profiled part but also portions of the melted décor film or décor layer. The latter can contain various materials whose properties can differ from those of the base material of the profiled part. As a rule, the base material of the profiled part consists of a thermoplastic material such as, for instance, PVC, while the material of the décor film or décor layer sometimes consists of other plastics. A décor film can consist, for example, of a PVC semi-hard film that is pigmented and/or coated with printing ink, which, for weathering protection, can be laminated with a transparent acrylate film.

Moreover, the excess melt can contain portions of melted protective film. The protective film can be made of another material such as, for instance, LDPE, and it can be detachably affixed to the profiled part by means of an adhesive. As a rule, the profiled parts are almost completely covered with protective films in order to prevent damage to the profiled parts as well as to the workpieces made thereof during transportation and installation. Normally, the protective film extends into the area of the excess melt if it has not been removed in a preceding work step.

Once the partial melting step has been completed, the profiled parts that have been clamped onto the profile supports are moved apart from each other so that the heating element can be removed from the area between the joining faces of the profiled parts. In this process, the limiting elements resting on the profiled part or profiled parts move back and forth together with the profile supports.

In a manner according to the invention that differs from the prior-art methods that avoid the formation of a weld bead, when the parts that are to be joined later are in the position where they have been moved apart from each other, the excess melt is not conveyed back to the joining face, but rather, it is segregated by means of the counter tool. The term "segregation" refers here to the fact that the melt that has escaped outwards over the separating edge is cut off from the melt that is present on the joining face and the separate mass of material created in this process is severed from the profiled part in question. Owing to the segregation, the melt that has been cut-off cools off to such an extent that it already falls off as a solidified piece of profile material.

An advantage of the invention lies especially in the fact that the impurities present in the excess melt stemming from décor and protective film portions as well as from the melt portions which have already cooled off to a greater extent and which are then only present as a pasty mass are no longer mixed with the melt that is needed for the actual joining. This translates into a high-quality welded connection. Studies have shown that, in this manner, the strength values of corner connections can be markedly improved in comparison to the prior-art corner connections which are likewise aimed at preventing a weld bead. As a result, laborious finishing work precisely on the exposed surfaces of the profiled parts can be reduced to a minimum or can even be completely avoided. This is even the case when the previous on-site removal of the protective film is dispensed with.

Preferably, the counter tool can execute a rolling movement during the segregation step. In this manner, only slight shear forces or else none at all are exerted onto the melt being processed by the counter tool. Consequently, the melt that is present on the joining face of the profiled part is hardly or not at all moved, which improves the quality and strength of the joined connection thus created. Moreover, the sliding friction between the profiled part or the separating edge and the counter tool can be diminished, thereby reducing the wear and tear to the tools that come into contact with each other when they are in their operating position.

Another likewise advantageous embodiment of the invention is that the counter tool is brought into contact with the separating edge, at least in certain sections, during the segregation of the excess melt. This allows a very reliable segregation of the excess melt from the melt that remains on the joining face. The melt is already cut off where the separating edge and the counter tool come into direct contact with each other. The excess melt is severed so to speak. This tool principle is comparable to wedge-action cutting or "blade cutting", or else to shearing according to German standard DIN 8588. In this context, the limiting element is the stationary tool with a separating edge that functions as the blade, while the movable counter tool constitutes the anvil or counter blade that is configured so as to be blunt.

In a refinement of the invention, it can also be provided that the counter tool is placed onto the separating edge, especially in that it is spring-loaded or else is moved by its own drive.

It can be particularly advantageous if the counter tool and the limiting element are in mechanical contact with each other via the active separating edge during the segregation procedure. This allows a very "clean cut" that segregates the excess melt, and any optionally present protective film, from the profiled part.

Thanks to the spring loading, the guide of the counter tool can have a certain tolerance that is compensated for by the spring force as well as by the spring travel. Tolerances at the edge of the profiled part can also be compensated for in this manner.

Moreover, in the method according to the invention, it can also be provided that the limiting element is moved in the plane of the outer surface of the profiled part on which it rests, that is to say, relative to the joining face into at least two positions, especially into an advanced position during the segregation step and into a retracted position during the joining step or vice versa. Accordingly, the device according to the invention can be provided with an appropriate guide that allows such a movement of the limiting element.

In the advanced position of the limiting element, its separating edge can be arranged on or just behind the area up to which the profiled part is melted off. This area or point is also referred to as the melting end point. Since the compression process also starts at this place during the joining step, this same area is also referred to as the start of the compression stroke. Opposite from this area in the joining or compressing direction in a recessed position, there is a so-called joining end point or the end of the compression stroke. During the compression, the profiled part in question is shortened all the way to the joining end point. In other words, the advanced position of the limiting element can be between the joining end point and the melting end point. The retracted position, which is the "compression position" during the joining procedure, can be behind the joining end point in order to prevent the opposite limiting elements of the two profiled parts from colliding with each other.

It has also been found to be advantageous for the counter tool to be guided towards the separating edge at a prescribed tool distance, preferably less than 0.5 mm, especially in the range of less than 0.2 mm and more than 0 mm, especially preferably at 0.1 mm. As a result, direct contact between the counter tool and the separating edge of the limiting element is avoided, thereby preventing the risk of wear and tear at the separating edge of the limiting element or at the counter tool. It has also been found that a reliable segregation can be achieved by adhering to the prescribed tool distance.

According to the invention, the counter tool can also be configured in the form of a blade and can execute a pushing movement comprising a movement component that runs along the separating edge and a movement component that runs crosswise thereto. The result is that the counter tool executes a movement that runs at an angle relative to the separating edge. With this alternative to a counter tool that executes purely a rolling movement, the blade-like counter tool on the separating edge is moved in the direction of the separating edge and, at the same time, crosswise thereto and, in this way, the excess melt that is to be segregated is pushed away from the joining face.

Preferably, the blade-like counter tool can be arranged at an angle to the joining face or to the joining plane defined by the joining face. Due to the crosswise movement and the angled position of the counter tool, the excess melt can be more effectively carried away from the profiled part and can then be neatly segregated.

According to another embodiment, it is possible for the counter tool to execute a combined pushing and rolling movement.

In a refinement of the invention, in the area that is processed by the counter tool, the profile edge of the appertaining profiled part that limits the joining face towards the outside can be shaped at least in some sections inwards in the direction of the joining face by means of the counter tool itself or by means of a separately movable finishing tool. In this manner, the profile edge, in other words, the rim of the joining face, is supposed to be imparted with an "orientation" into which the profile edge is displaced during the subsequent joining step and the compression that is carried out in this process. During the compression, the profile edge moves inwards towards the joining face, thus virtually automatically forming a so-called "shadow groove" or V-groove at the connection site while, at the same time, countering any visible escape of base material that might be located underneath the coat of paint on the profile surface. In this manner, any height differences that might exist between the profiled parts that have been joined together can be concealed or visually smoothed out.

In an advantageous configuration, the segregation of the excess melt can be followed by a finishing step employing a finishing tool during which the profile edge is shaped. A separate finishing tool and a step that is separate from the segregation step can adapt the type and extent of the finishing as needed.

As an alternative, it can be advantageous to already shape the profile edge together with the movement of the counter tool along the separating edge. This can be done, for instance, by employing a contoured counter tool, for example, a roller, and it entails advantages in terms of reduced cycle times for the manufacturing process.

It is likewise conceivable for the finishing tool to process both profiled parts at the same time.

Fundamentally, processing by means of the finishing tool can be carried out in such a way that the appertaining profile edge of the profiled part is shaped by the finishing tool prior to the joining step, and the joining line resulting from the weld seam is given a shape during or after completion of the joining step. In this process, the finishing tool that serves to shape the profile edges can be moved towards the ends of the profiled parts for purposes of shaping the profile edges. Subsequently, the finishing tool can be left in this position, while the profiled ends are moved towards each other during the joining step, a process in which they are compressed to create the welded connection. The shape that is thus given to the resulting joining line stems from the shape of the processing faces of the finishing tool that are in contact with the profiled parts during the compression.

According to a conceivable embodiment of the invention, however, the processing by means of the finishing tool can also be executed in two stages. In particular, it can be provided for the finishing to take place in such a way that the appertaining profile edge of the profiled parts is shaped by means of the finishing tool in a first processing stage prior to the joining step. In a second processing stage, which takes place during or after completion of the joining step—in other words, the compression—the joining line resulting from the weld seam can be given a shape by means of the finishing tool. For this purpose, the finishing tool can be pulled back and then moved once again towards the joining site. For instance, a V-shaped groove can be created in this process.

The finishing tool can be used to limit the flow of the melt towards the exposed surface during the joining step. This can be utilized, for example, in order to give a certain shape, for instance, the above-mentioned V-shaped groove, to the joining line resulting from the weld seam.

The device being proposed according to claim 15 for connecting at least two profiled parts can be configured especially for the production of profiled parts made of a thermoplastic material for door frames or window frames or for door leaves or window casements. The device has at least two profile supports that can be moved relative to each other and that serve to secure at least two profiled parts. Moreover, a heating element that can be inserted between the profile supports is provided for purposes of partially melting the respective ends of the at least two secured profiled parts at their joining faces. In this context, at least one limiting element that rests on or against at least one outer surface of at least one profiled part is provided, preferably for contacting at least one exposed surface and/or at least one functional surface. The limiting element is configured with a separating edge that serves to control and/or limit the escape of excess melt towards the outer surface of the profiled part at the transition site to the corresponding joining face. The device has a counter tool for segregating the excess melt that has escaped over the separating edge, whereby said counter tool can be moved along the separating edge and through the melt.

The device according to the invention can also be configured in such a way that the counter tool is designed so that it can be rotated or swiveled relative to the separating edge. The counter tool can preferably be configured as a roller. In this manner, the counter tool can execute the above-mentioned rolling movement.

According to the invention, it has been proven to be advantageous for the processing face, especially the lateral surface of the counter tool, to be contoured. A contour can be provided on the joining face for purposes of influencing the melt in order to also shape the profile edge, for example, concurrently with the movement of the counter tool along the separating edge of the limiting element.

Alternatively, the profile edge can be also shaped by means of a finishing tool that serves to process the profile edge, whereby the finishing tool is preferably configured as a roller or as a strip or as a rocker, whereby the roller, strip or rocker can preferably have an embossed contour, especially a V-shaped embossed contour. In the first variant, the roller can be guided over the profile edge after the segregation procedure immediately before, during or immediately after the compression. In the second variant, the strip is guided over the profile edge after the segregation procedure. This, too, can be carried out immediately before, during or immediately after the joining or the compression. In the last variant, the rocker is guided over the profile edge after the segregation procedure. This can likewise be carried out immediately before, during or immediately after the joining or the compression. In this manner, a V-groove can be created at the connection site of the joint.

According to a refinement of the invention, the movements of the heating element and/or of the counter tool and/or of the finishing tool are coupled, at least partially, in order to shape the profile edge. Coupling the movements of the individual elements of the device can, in turn, translate into a reduction of the cycle time. Moreover, under certain circumstances, there is no need for additional actuators to generate the movement of the counter tool.

According to a refinement of the invention, the finishing tool can be configured to concurrently process the two profiled parts that are to be joined together. This more effectively allows a time-saving, synchronous processing of the profiled ends. Moreover, the finishing tool can be moved with just one drive.

The finishing tool can preferably have a processing face that can be brought into contact with the profiled part and that, at least in certain sections, runs at an angle greater than 0° relative to the joining face. In this manner, the shaping of the profile edge after the segregation step is gentler and more controlled.

It is likewise possible to configure the finishing tool with at least a second processing face that adjoins the first processing face and that runs at a different angle relative to the joining face. Such a configuration allows the processing of the profiled ends or of the weld seam to be carried out in a particularly gentle and targeted manner before and during the joining step. The first processing face can serve, for instance, to shape the profile edge prior to the compression, whereas the second processing face either limits the flow of melt outwards onto the exposed surfaces during the joining step or else serves to create a groove that runs along the joined seam. In the latter case, the finishing tool is used as a kind of stamping tool in the second processing stage.

For purposes of carrying out the segregation, the counter tool element can also be equipped with a drive of its own, for example, a rotary drive, or else it can be connected to the drive.

The limiting element, preferably the separating edge and/or the counter tool can be configured so that they can be warmed up or cooled down to various temperatures. This allows the cooling of the excess melt to be influenced in a targeted manner in order to achieve a reliable segregation.

As far as the material properties are concerned, it can also be provided for the counter tool to be configured so as to be more resistant or less resistant to the separating edge in terms of mechanical wear and tear.

In this context, the components should preferably be made of high-strength, heat-treated and/or coated materials in order to ensure low wear and tear. The wear and tear over the course of a long tool life can occur, for example, when the lateral surface of the counter tool strikes the separating edge of the limiting element as it rolls along it.

For instance, the limiting elements can be made of heat-treated surgical stainless steel. The counter tool can also consist of a round material that has likewise undergone a heat treatment. Conceivable examples here are steel grades used for the production of ball bearings. Owing to the heat treatment, the part in question can be partially or completely hardened. The materials as well as the optionally performed heat treatment that serves to set the individual degree of hardness of the components to significantly different values can be selected for purposes of deliberately establishing one of the two components, in other words, either the counter tool or the separating edge, as the wearing part having a given tool life.

As an alternative to this, it is likewise possible to set the counter tool as well as the limiting element to very similar or identical wearing properties so that hardly any significant wear and tear occurs on one of the components over the course of a long tool life.

Preferably, the height of at least one counter tool can be adjusted in order to set different profile thicknesses and/or to set different tool overlaps between the counter tool and the joining face of the profiled part. Moreover, it can be provided that the height adjustment is configured for a rough and/or fine adjustment of the profile thickness, whereby the rough adjustment is preferably in the form of millimeter increments while the fine adjustment is preferably in the form of, for example, increments of tenths of a millimeter. The height of the counter tool can be fine-adjusted in order to ensure an improved setting relative to the separating edge, whereby it has been proven to be advantageous if the counter tool only comes into slight contact with the excess melt between the separating edge and the joining face. This is aimed at not mixing the melt any further in this area and at not cooling it off too much due to contact with the cool tool.

In one embodiment, the counter tool can assume a fixed height position on the exposed surface that rests on the profile support, and can only be fine-adjusted there. The other counter tool for performing the segregation on the opposite exposed surface can be configured so that it can be set and fine-adjusted to different profile heights. This can be done automatically or manually. This translates into a very high level of flexibility when profiled parts of different shapes are being processed.

According to the invention, it has been found to be advantageous for the counter tool to be arranged at a setting angle α relative to the plane of the joining face. Different angle settings of the counter tool can have a positive influence on the result of the segregation and can also reduce an undesired cooling of the melt in certain areas on the joining face. Preferably, the angle adjustment of the counter tool can be configured such that the counter tool is at a distance from the joining face on the side of the separating edge that faces the joining face.

DESCRIPTION OF THE DRAWINGS

Additional objectives, advantages, features and application possibilities of the present invention can be gleaned from the description below of several embodiments making reference to the drawing. In this context, all of the described and/or depicted features, either on their own or in any meaningful combination, constitute the subject matter of the present invention, also irrespective of their compilation in the claims or in the claims to which they refer.

In this context, the following is shown schematically:

FIGS. 5a to 5d the profiled part according to FIG. 1 immediately before the segregation step;

FIGS. 6a to 6d a functional diagram to illustrate possible tool positions during the segregation step;

DETAILED DESCRIPTION

Figure 1:
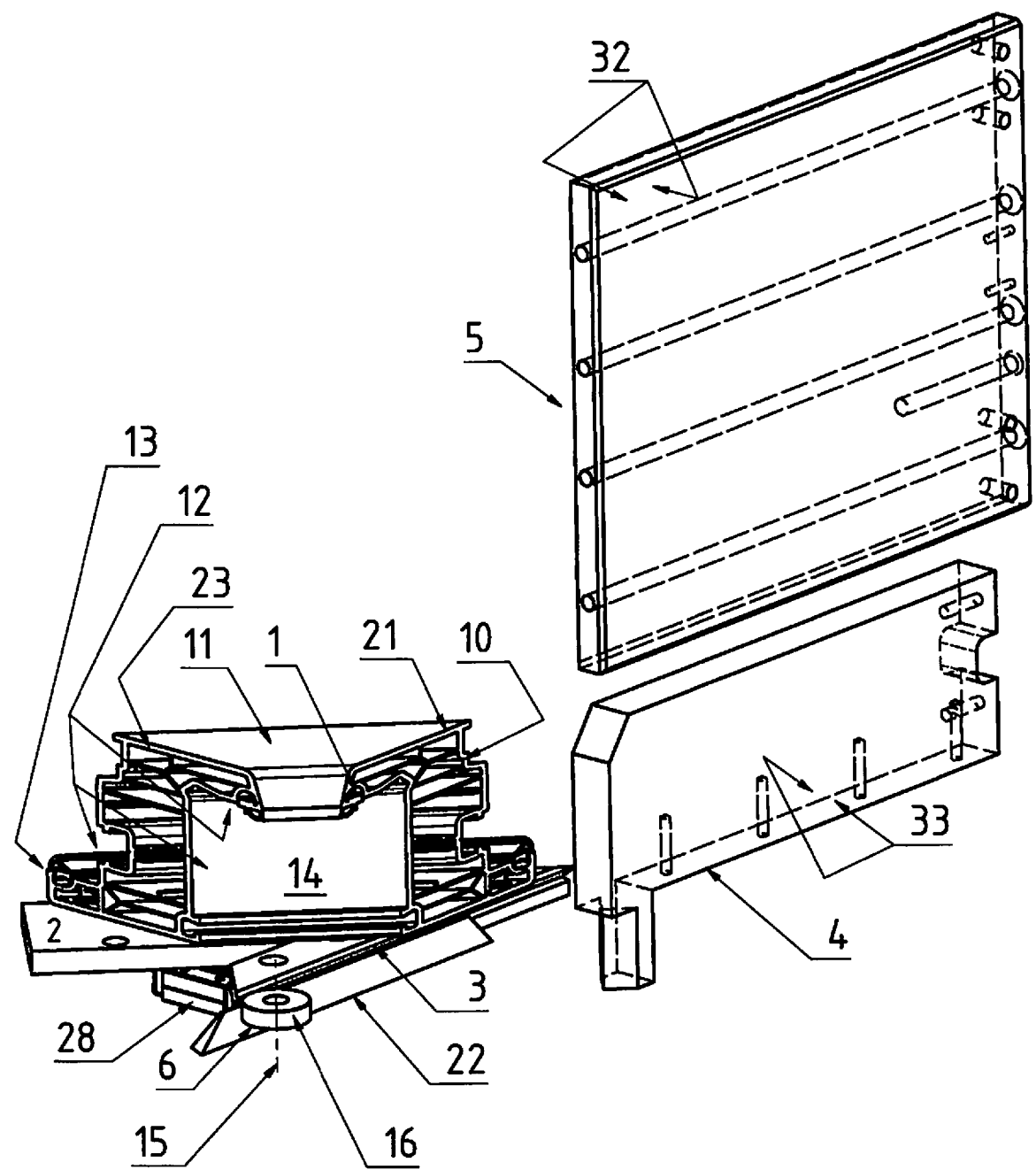
FIG. 1 a schematic view of a profiled part that is to be joined, in a welding machine.

For the sake of clarity, identical components or those having the same effect are provided with the same reference numerals in the figures shown below, making reference to several embodiments.

The present invention relates to a device 44 in the form of a welding machine, sections of which are shown in FIG. 1. FIGS. 8a and 8b show an overview of a device 44 according to the invention, in the form of a welding machine in which the profiled parts 1 and 34 which are to be joined to each other and whose joining faces 10 are opposite from each other can be seen. For the sake of simplicity, however, only the profiled part 1 is shown in FIGS. 1 to 7. As a rule, however, the appertaining method steps are carried out on both profiled parts 1, 34 out at the same time.

FIG. 1 shows a profiled part 1 that is placed onto a profile support 2 of the device and that is secured on the profile support 2 by means of a clamping device (not shown here). A limiting element 3 is arranged on the profile support 2 and it rests against the outer surface of the profiled part 1—here on the lower exposed surface 11 which is concealed in FIG. 1—thus being adjacent to the joining face 10 of the profiled part 1. FIG. 1 also shows a profile stop 4 for positioning and aligning the profiled part 1 on the profile support 2. A second profiled part 34 that has been placed into the device is also aligned on the same profile stop 4. This second profiled part 34, which is going to be connected to the first profiled part 1, is only shown in FIGS. 8a and 8b. The device also has a heating element 5 which is configured here as a heating plate.

The profile stop 4 and the heating element 5 both have a flat configuration. The heating surfaces 32 of the heating element 5 as well as the stop surfaces 32 of the profile stop 4 run parallel to each other, so that the profiled parts 1, 34 that are aligned on the profile stop 4 or on the joining faces 10 of the profiled parts 1, 34 are aligned on the heating surfaces 32 of the heating element 5.

In this case, the profiled part 1 is a profiled element 1 made of a thermoplastic material, for instance, PVC, that serves for the manufacture of a window casement. The profiled part 1 is configured as an extruded profile having several walls 23 which run parallel, crosswise and at an angle to each other, and whose outermost rim forms the profile edge 21. Here, the profiled part 1 has exposed surfaces 11 and functional surfaces 12 that form the outer surfaces of the profiled part 1. The exposed surfaces 11 are the surfaces that are visible on the outside when the window is in its completely installed state. The functional surfaces 12 are the surfaces needed for the various functions of the window casement such as, for example, the overhang 13 which seals the window relative to the window frame, the support surface 14 which supports a window pane installed in the window as well as other functional surfaces 12 on which, for instance, window pane gaskets are arranged.

The device has a counter tool 6, here in the form of a roller, that is mounted so as to pivot around an axis of rotation 15. In this context, the axis of rotation 15 runs approximately parallel to the joining face 10 formed by the cut surface of the profiled part 1. Moreover, FIG. 1 shows a finishing tool 22 as well as a guide 28 that allows the limiting element 3 to be moved.

Figure 2A:
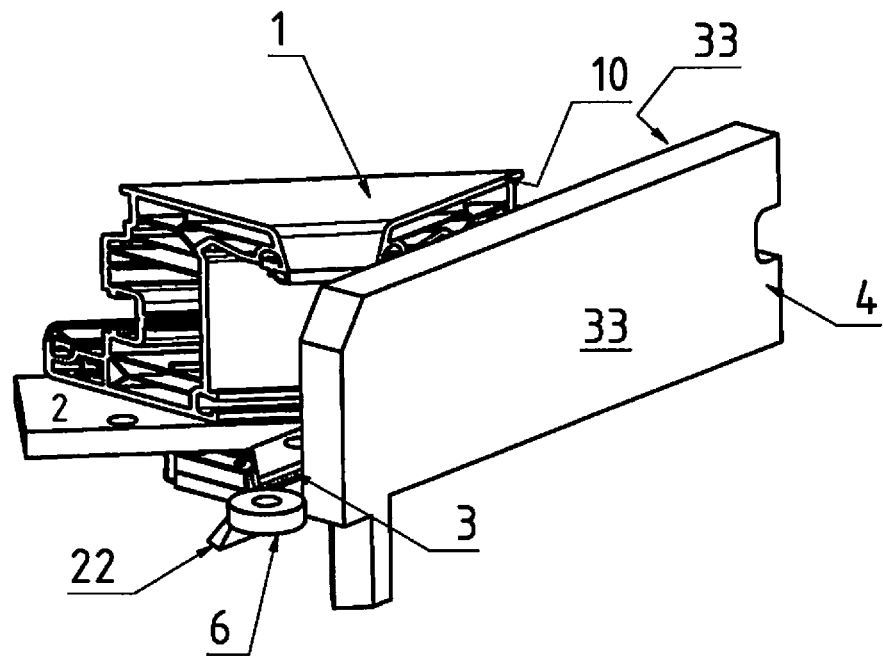
FIGS. 2a & 2b the profiled part according to FIG. 1 during the positioning step on the profile stop.
Figure 2B:
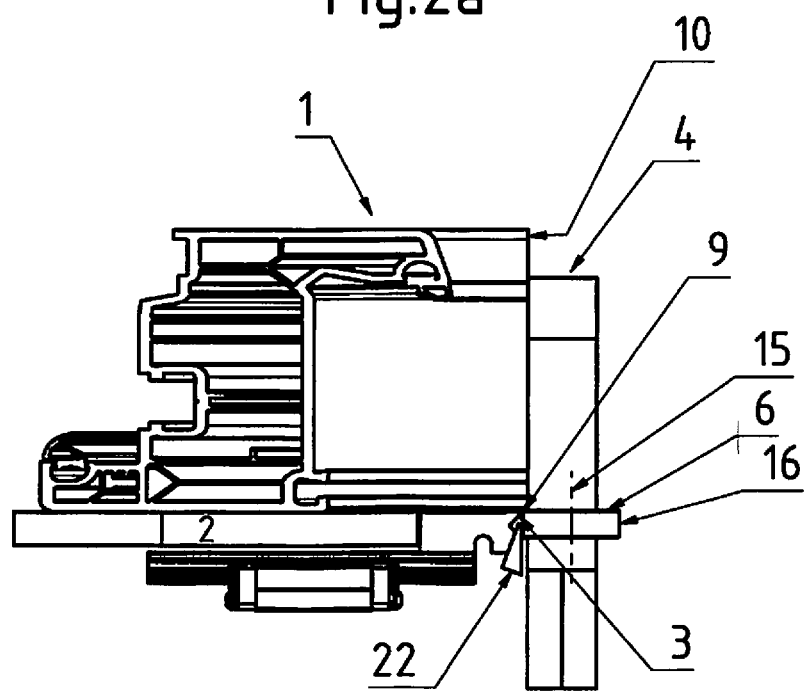

FIGS. 2a and 2b schematically show the so-called positioning step which can be part of the method according to the invention. During this positioning step, the joining face 10 of the appertaining profiled part 1, 34 is pressed against a stop surface 33 of the profile stop 4 for purposes of aligning the joining face 10 on the stop surface 33. Both profiled parts 1, 34 can be positioned at the same time when they are pressed against the stop surfaces 33 of the profile stop 4 in order to align the appertaining joining faces 10 relative to the profile stop 4 and thus relative to the heating element 5 as well as to each other.

The limiting element 3 has a separating edge 9 that runs along the joining face 10. During the positioning step, a gap is left between the appertaining stop surfaces 33 and the appertaining separating edge 9, so that the joining faces 10 come to rest completely against the profile stop. Once the profiled part 1 has been aligned on the profile stop 4, the profiled part 1 is secured onto the profile support 2 so tightly that no substantial movement can occur between the profiled part 1 and the profile support 2 during the subsequent steps.

Figure 3A:
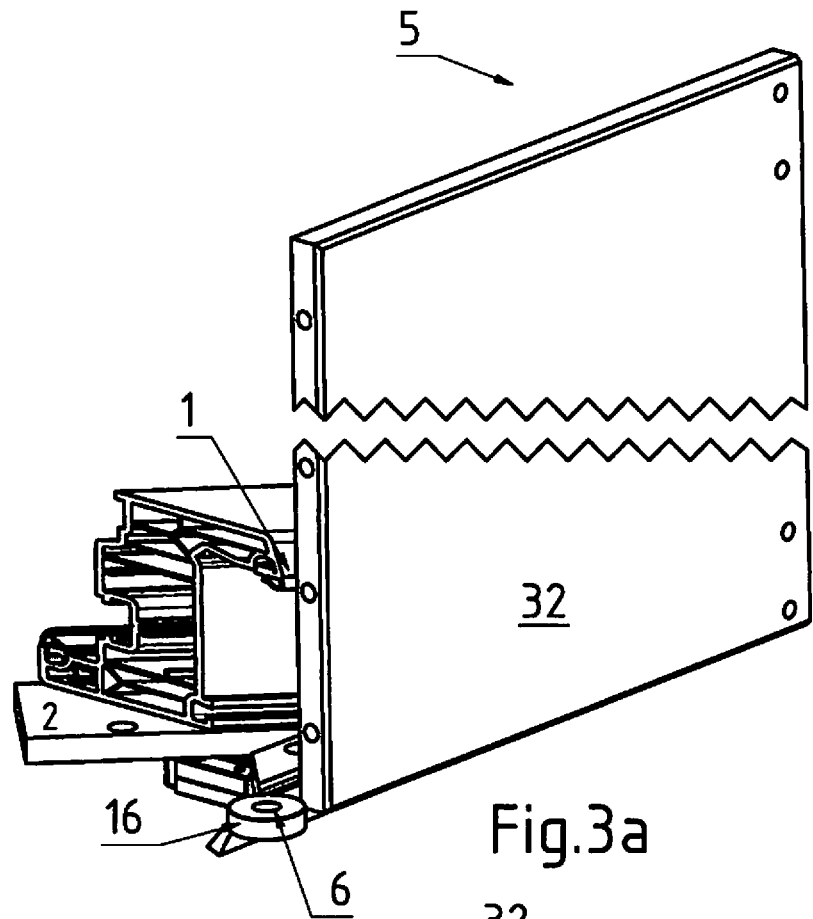
FIGS. 3a & 3b the profiled part according to FIG. 1 during the partial melting step.
Figure 3B:
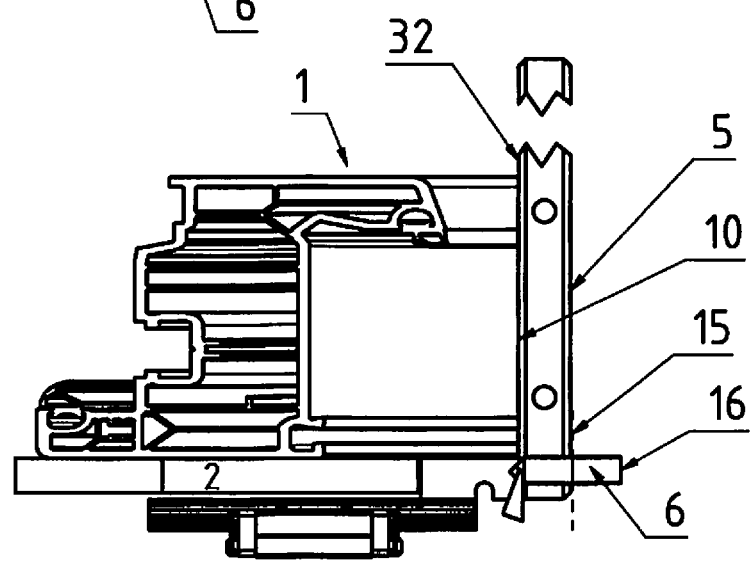
Figure 4A:
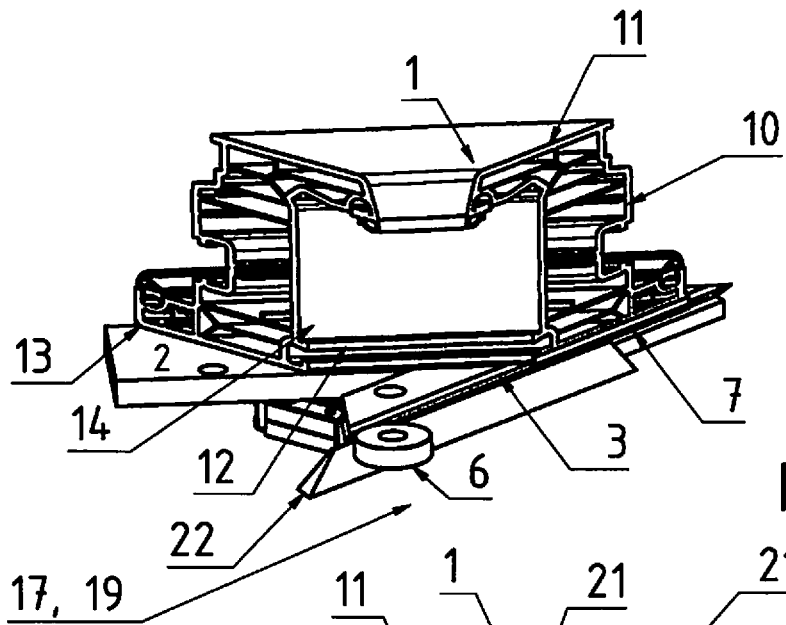
FIGS. 4a to 4c the profiled part according to FIG. 1 after the partial melting step.
Figure 4B:
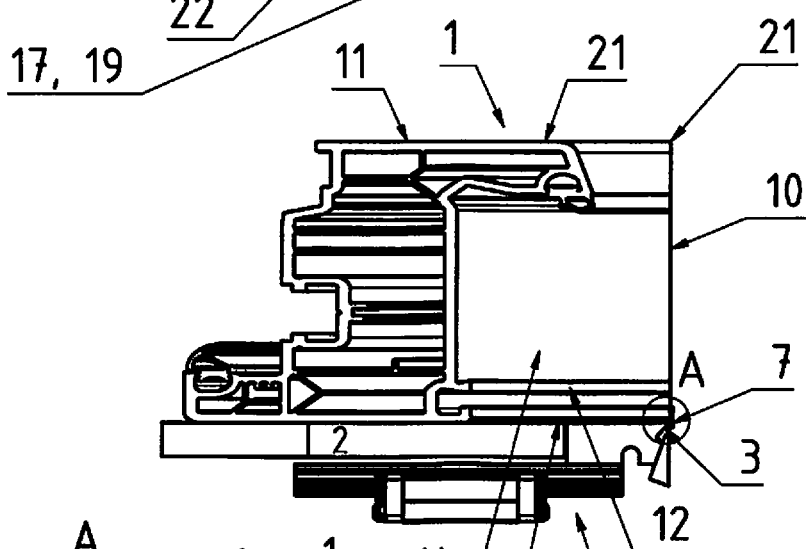
Figure 4C:
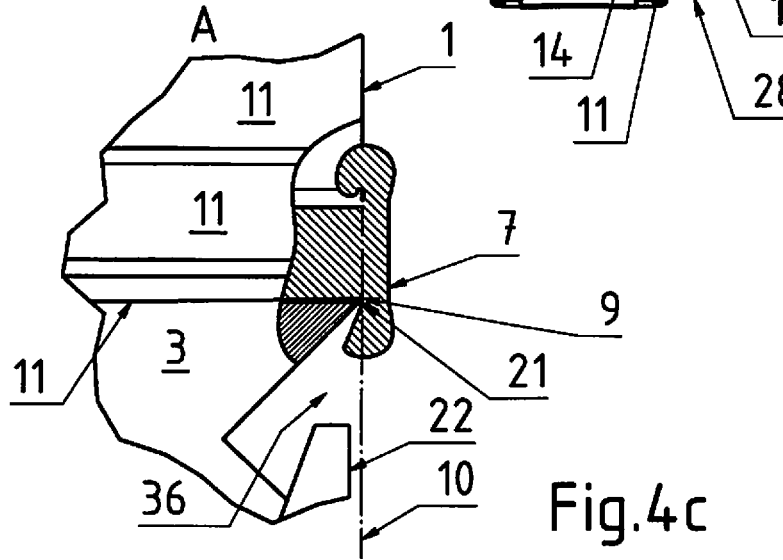

FIGS. 3a and 3b show the partial melting step in which the joining face 10 of the profiled part 1 is pressed against a heating surface 32 of the heating plate, namely, the heating element 5, in order to partially melt the profiled part 1 at the end face of its joining face 10. For this purpose, the appertaining profile supports 2 are moved in the direction of the heating element 5 which was moved between the joining faces 10 of the profiled parts 1, 34 after the profile stop 4 was removed.

After completion of the partial melting step, the heating element 5 between the profiled parts 1, 34 is removed, as is shown in FIGS. 4a to 4c and 5a to 5d. Excess melt 7 which was formed during the partial melting step and which had escaped from the joining face 10 over the separating edges 9 of the limiting element 3 into the area of an undercut 36 of the limiting element 3 during the partial melting is segregated by moving the counter tool 6 along the separating edge 9. In this process, the counter tool 6 is moved along the separating edge 9 of the limiting element 3 and it comes into contact with the melt that is present on the joining face 10 as well as with the excess melt 7 that has escaped over the separating edge 9. The counter tool 6 tapers or splits the excess melt 7 at its root on the separating edge 9 to such an extent that the excess melt 7 is severed from the melt remaining on the joining face 10.

In order to do so, the lateral surface 16 of the counter tool 6, which is configured as a roller in the present embodiment, rolls over the separating edge 9 of the limiting element 3, as a result of which the melt that has escaped to the outside, namely, the excess melt 7, 8, is severed.

In FIGS. 4 and 5, the counter-tool movement 19 takes place as a movement component 17 that runs along the separating edge 9. The counter-tool movement 19 can occur simultaneously with the removal of the heating element 5 if, for example, the heating element 5 as well as the counter tool 6 are held on a shared holder 43 so that their movements are coupled, as can be seen in FIGS. 8a and 8b. As an alternative to this, the heating element 5 can be removed first and only after that does the counter-tool movement 19 occur, whereby the counter tool 6 can be moved by its own drive for this purpose.

The counter tool 6 can be pressed by means of spring-loading against the separating edge 9 of the limiting element 3. As an alternative to this, the counter tool 6 can be guided along the separating edge 9 of the limiting element 3 while maintaining a prescribed tool distance 20, which is shown in FIG. 6d. This causes the excess melt 7 to become tapered at its root adjacent to the joining face 10 to such an extent that the excess melt 7 is severed, in other words, segregated. The segregated excess melt 8 can be present in the form of a cohesive chip that is formed during the segregation step due to immediate solidification of the previously liquid or pasty excess melt 7.

The limiting element 3 can also be moved by means of spring-loading in the direction of the joining face 10 so that, on the one hand, the narrowest possible gap is formed between the heating surface 32 and the separating edge 9 during the partial melting step and, on the other hand, so that a corresponding spring pre-tensioning relative to the counter tool 6 is ensured.

The counter tool 6 can be configured, for instance, as a ball bearing whose outer bearing ring forms the lateral surface 16.

As can be seen in FIGS. 8a and 8b, each outer surface, especially the exposed surface 11 of the appertaining profiled part 1, 34, can be provided with its own counter tool so that a total of four counter tools 6 are used when two opposite exposed surfaces 11 of two profiled parts 1, 34 are being processed at the same time.

The function of the limiting element 3 can be additionally augmented by the finishing tool 22 that can reduce the escape of excess melt 7 to the outside during the partial melting step. At the same time, the finishing tool 22, which is approximately flush with the joining plane 10, can form a support for the counter tool 6 on which the counter tools 6 can roll.

FIGS. 5a to 5d show the segregation of the excess melt 7 so as to form the segregated excess melt 8. Especially FIG. 5d shows the formation of the segregated excess melt 8 as a single cohesive chip.

FIGS. 6a to 6d show a functional diagram which is meant to illustrate that the limiting element 3 can execute a movement 30 oriented in the direction of, or counter to, the counter tool 6, and this movement can be executed either by the counter tool 6 that is in contact with the separating edge 7 or else by a separate actuator that is connected to the limiting element 3. In this manner, it is possible to set the tool distance 20 or the contact pressure between the counter tool 6 and the limiting element 3.

FIG. 6c shows the various work areas relevant for joining the profiled part 1. The profile is first cut to the profile cut length 24 which is longer—by the so-called burn-off—than the final dimension required for the joined profiled part. Likewise shown is the melting end-point line 26 which designates the area up to which the heating element 5 penetrates into the material of the profiled part 1 during the partial melting step. The material that is melted in this process escapes to the sides in the form of excess melt 7.

Moreover, the cutting-area line 25 between the melting end-point line 26 and joining end-point line 27 is shown, said cutting-area line 25 designating the plane up to which the counter tool 6 penetrates into the molten or softened material of the profiled part 1 during the segregation step, in this case, into the profile wall 23 that is to be processed. Finally, the joining end-point line 27 designates the area up to which the profiled part 1 is compressed at its profile wall 23 during the subsequent joining step. The method can also be modified in such a way that the cutting-area line 25 as well as the melting end-point line 26 coincide or that the joining end-point line 27 and the cutting-area line 25 coincide. Preference, however, is given to the arrangement shown in FIG. 6c, in which the cutting-area line 25 is closer to the melting end-point line 26 than to the joining end-point line 27.

The position of the cutting-area line 25, of the melting end-point line 26 and of the joining end-point line 27 can be varied within certain limits, as a function of the profile, the material and the shape of the profile. As an alternative, it can also be practical for the melting end-point line 26 to be situated between the cutting-area line 25 and the joining end-point line 27. This can but does not necessarily have to be the case if, for example, in certain variants of the invention, a tool distance 20 is provided within the range of, for instance, less than 0.5 mm, especially 0.1 mm to 0.2 mm, between the separating edge 9 of the limiting element 3 and the counter tool 6. Then, direct contact between the counter tool 6 and the separating edge 9 should be avoided for reasons having to do with wear and tear. The movement 30 of the limiting element 3 within its guide 28 can also be utilized to set the tool distance 20.

Figure 7:
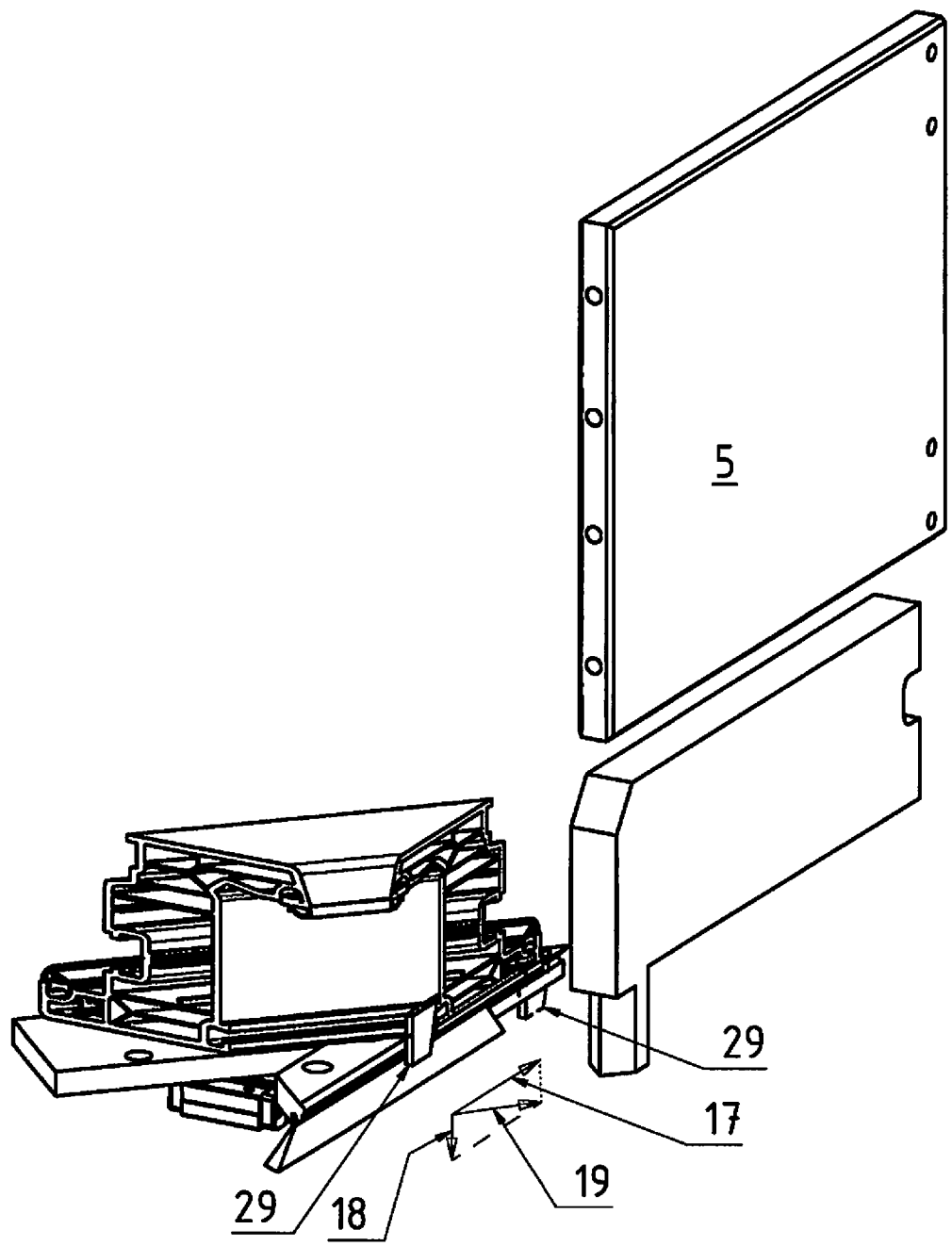
FIG. 7 a variant that has been modified in comparison to the one in FIG. 1, with an alternative counter tool.
Figure 8A:
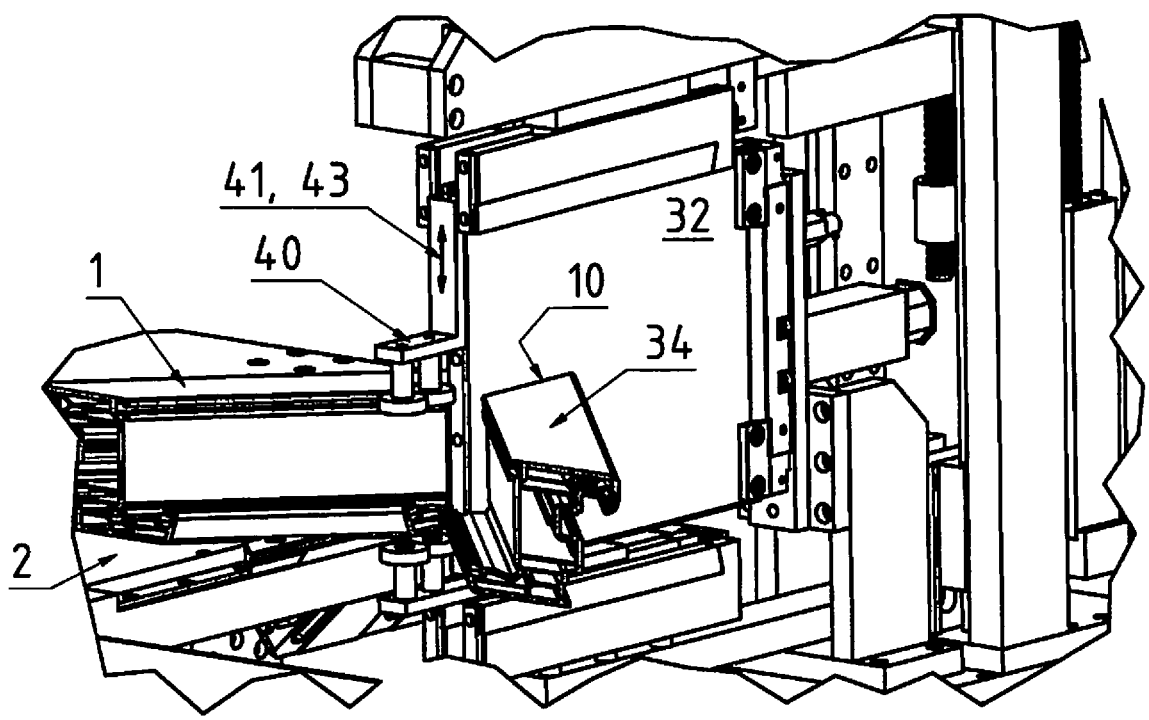
FIGS. 8a & 8b an overview of a welding machine according to the invention.
Figure 8B:
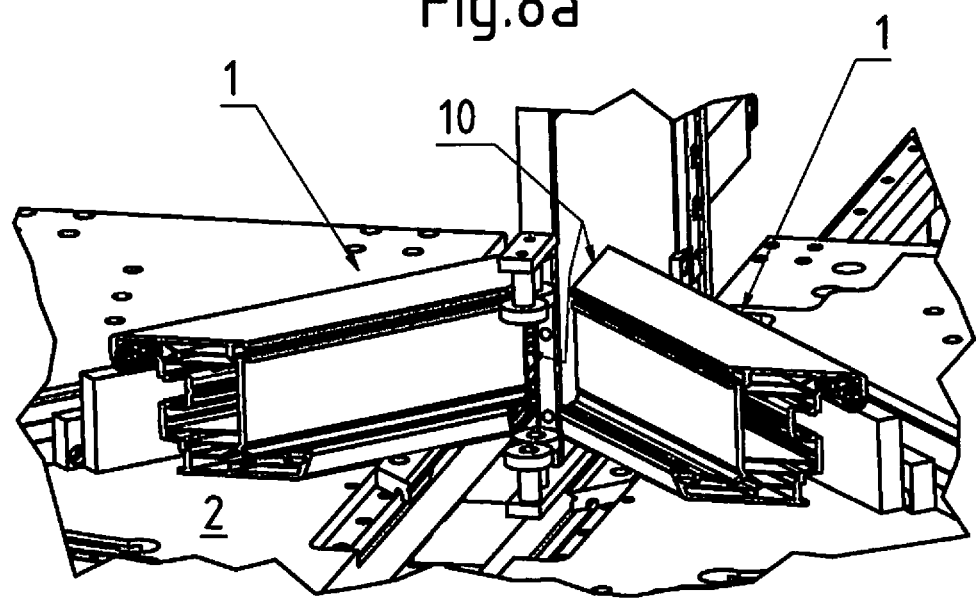

FIG. 7 shows an alternative embodiment of a counter tool 29 which does not execute a rolling movement like the above-mentioned roller, but rather, it is guided in a pushing movement consisting of a movement component 17 running along the separating edge and of a movement component 18 running crosswise thereto. All in all, the result is a movement 19 running at an angle to the separating edge 9, thereby segregating the excess melt 7. The individual movement components 17, 18 as well as the resulting movement 19 are shown schematically in FIG. 7. In this context, the counter tool 29 shown on the left in FIG. 7 is in its initial position, whereas the counter tool 29 indicated by broken lines is in its final position after the segregation procedure. The counter tool 29 can have a blade edge that is guided along the separating edge 9 and that serves to segregate the excess melt 7. Like the counter tool 6, the counter tool 29 can likewise be coupled to the movement of the heating element 5.

Figure 9A:
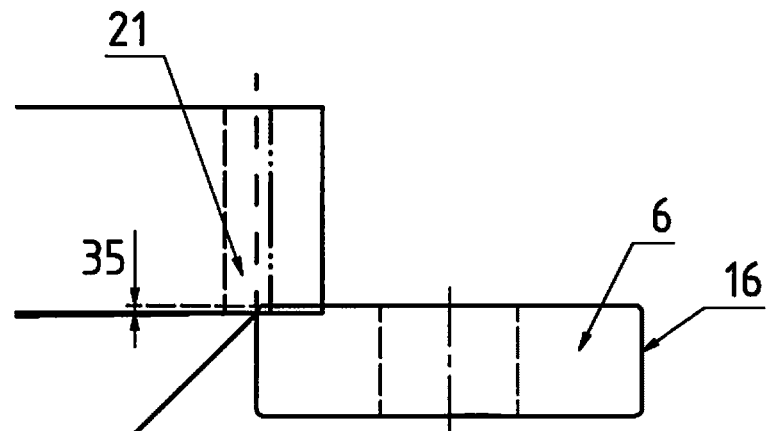
FIGS. 9a to 9c depictions of alternative embodiments of a counter tool.
Figure 9B:
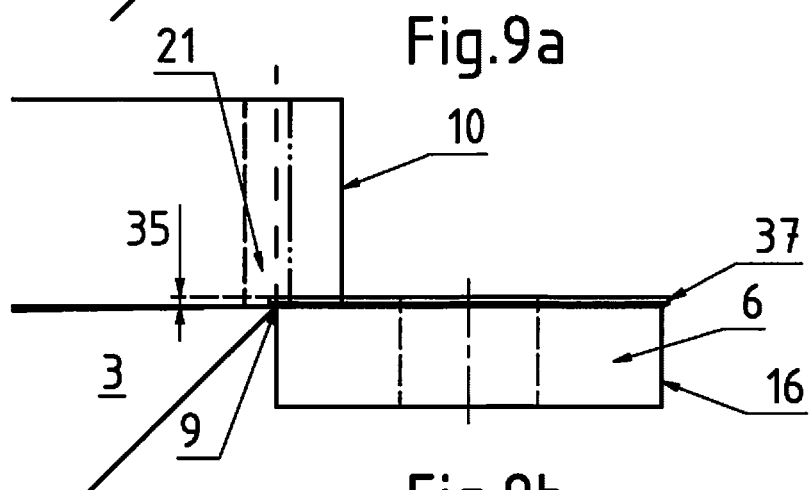
Figure 9C:
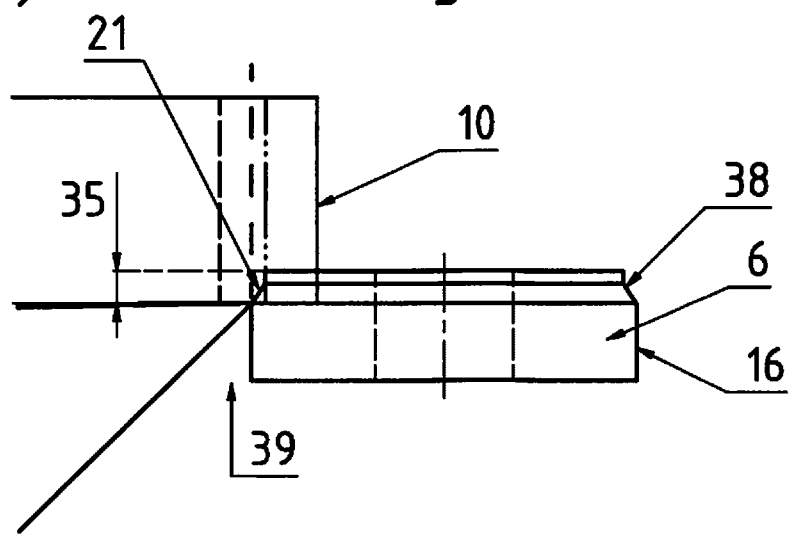

FIGS. 9a to 9c show different variants of the counter tool 6, which is configured as a roller. In FIG. 9a, the counter tool 6 is configured as a cylindrical roller whose cross section has a straight lateral surface 16. The counter tool 6 shown in FIG. 9b has an additional collar 37 whose diameter is larger than the rest of the lateral surface 16 and whose joining face 10 engages behind the separating edge 9 of the limiting element 3 in the area of the overlap 35 of the counter tool 6. In this variant of the counter tool 6 according to FIG. 9b, the limiting element 3 and the counter tool 6 move towards each other in the manner of shear-cutting tools.

In the variant of the counter tool 6 according to FIG. 9c, a shoulder 38 is provided in order to taper the counter tool 6 in the area of its overlap with the joining face 10.

In addition to optimizing the segregation of the excess melt 7, the thickness of the overlap 35 between the counter tool 6 and the joining face 10 of the profiled part 1 can also serve to already process the profile edge 21 in such a way that it is shaped towards the joining face 10, in other words, it is imparted with a direction 39 so to speak. In this imparted direction 39, the profile edge 21 is to be shaped during the joining step in such a way that a V-groove is created on the finished joined connection, at least to some extent.

Figure 10:
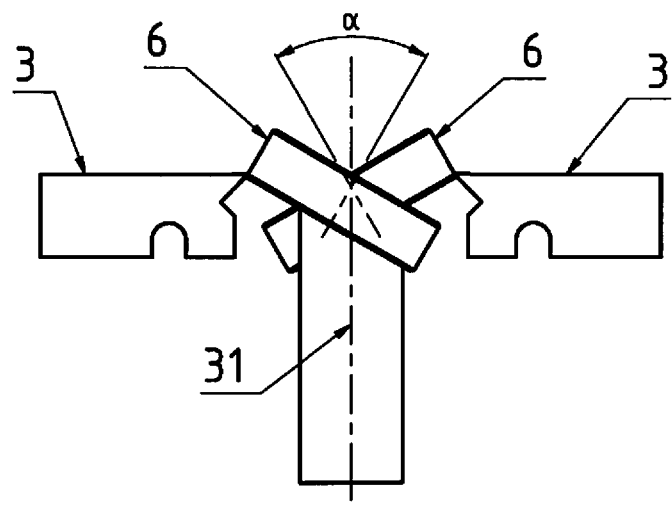
FIG. 10 a variant of the invention with a tilted counter tool arrangement.

Likewise in order to not only bring about such an effect but also to optimize the segregation of the excess melt, the counter tool 6, especially the counter tool 6 configured as a roller, can be arranged at a setting angle α relative to the joining face 10 or relative to a joining plane 31 running parallel thereto. This is schematically shown in FIG. 10. Depending on the application case in question, the setting angle α used in this context can be effectuated by an appropriate holder or by adjusting the attachment of the counter tool 6.

The overlap 35 shown in FIGS. 9a to 9c can be set by means of a fine adjustment, preferably to a precision of 0.1 mm. A fine-adjustment device is preferably provided on the counter tool holder 14 that, in any case, can be equipped with an adjustment means 41 that makes it possible to adapt to various profile thicknesses. A differentiation between setting and adjusting various profile thicknesses as well as fine adjustment lies in the fact that the height adjustment means 41 for the counter tool holder 40 should be adjustable to a precision of approximately 1 mm while the fine adjustment for establishing the overlap 35 can be adjusted to a precision of 0.1 mm. Depending on the application case in question, the absolute values can also diverge from this. It has been proven advantageous for the fine adjustment to allow a degree of precision that is at least 10 times greater than the actual height adjustment of the counter tool.

Figure 11A:
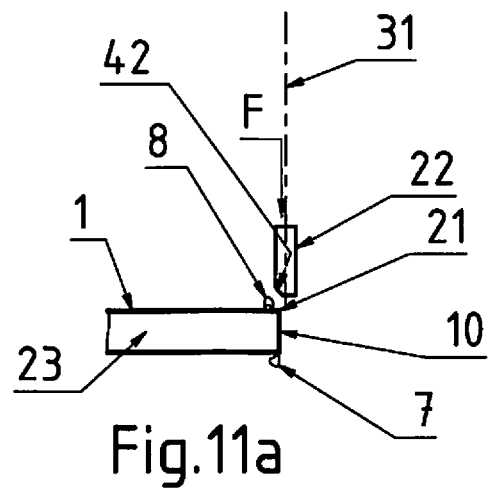
FIGS. 11a to 11c a functional diagram of the finishing step.
Figure 11B:
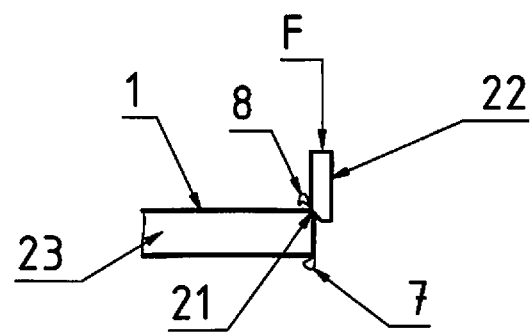
Figure 11C:
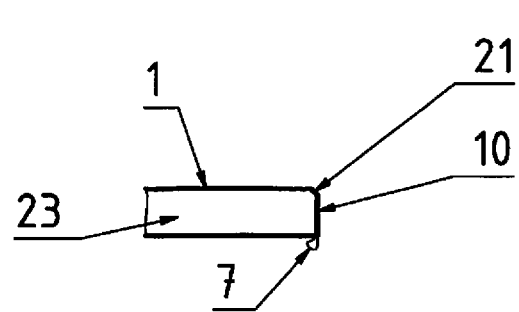

Finally, FIGS. 11a to 11c also show an optional finishing step in which, in the area being processed by the counter tool 6, 29, the finishing tool 22 shapes the profile edge 21 of the appertaining profiled part 1, 34 towards the inside in the direction of the joining face 10, at least in certain sections. In this context, the counter tool 22 can be moved, for example, in the joining plane 31, and, using a processing face 42 that is preferably placed at an angle to the joining face 10, the counter tool 22 can shape the profile edge 21 towards the inside by applying a processing force F, so that, during the subsequent joining procedure, a V-groove is created between the profiled parts 1 and 34 in the area of the weld.

As an alternative, the finishing tool 22 can also be used during the joining step, in other words, during the and/or after the compression.

Such a variant of the invention is shown in the schematic FIGS. 12a to 12e as well as in FIGS. 13a to 13e corresponding to thereto.

As can be seen in these figures, the device 44 has a modified finishing tool 22' that is concurrently employed to process the two profiled parts 1 and 34 that are to be joined to each other.

As can be seen in FIGS. 12a to 12e and 13a to 13e, first of all, the excess melt 7 is segregated by means of the counter tool 6. Once the segregated excess melt 8 has been removed, which is shown in the figures that follow FIG. 12d or 13d, both profiled parts 1, 34 are processed by means of the finishing tool 22'. In the example here, a two-stage finishing takes place in which first of all, the appertaining profile edge 21 is imparted with a direction of movement 48 oriented inwards towards the joining face 10, so that, during the subsequent joining, a V-groove is created between the profiled parts 1 and 34 in the area of the weld.

For this purpose, the finishing tool 22' that is employed in the present embodiment has processing faces 46 which are arranged mirror-symmetrically relative to each other and which run at an angle <45° relative to the joining face 10 in the embodiment selected here.

In order to ensure that, during the subsequent joining procedure—in other words, when the profiled parts 1 and 34 are compressed against each other—a V-groove is indeed created and that excess melt 7 that might be present cannot escape from the joining face 10 towards the outside in the direction of the exposed surfaces 11, the finishing tool 22' has the processing faces 47 which are configured mirror-symmetrically and run at an angle >45° relative to the joining face 10. The processing faces 47 form a "negative shape", in a manner of speaking, of the V-groove desired in the area of the welding site.

The processing faces 46 and 47 can also be in the form of a single processing face such as, for instance, a rounded-off surface.

Figure 12A:
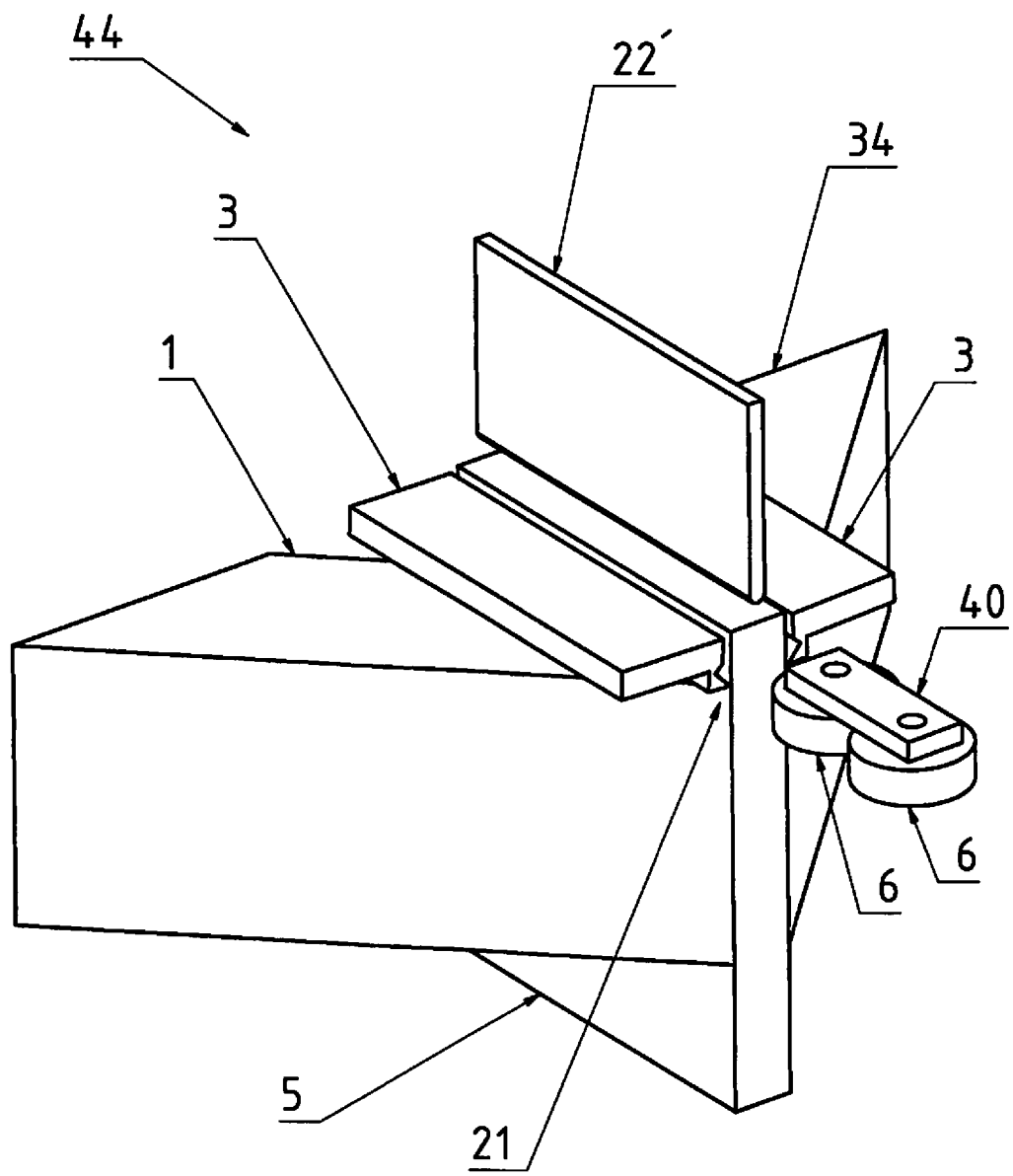
FIGS. 12a to 12e another embodiment, with an optional two-stage finishing method.
Figure 12B:
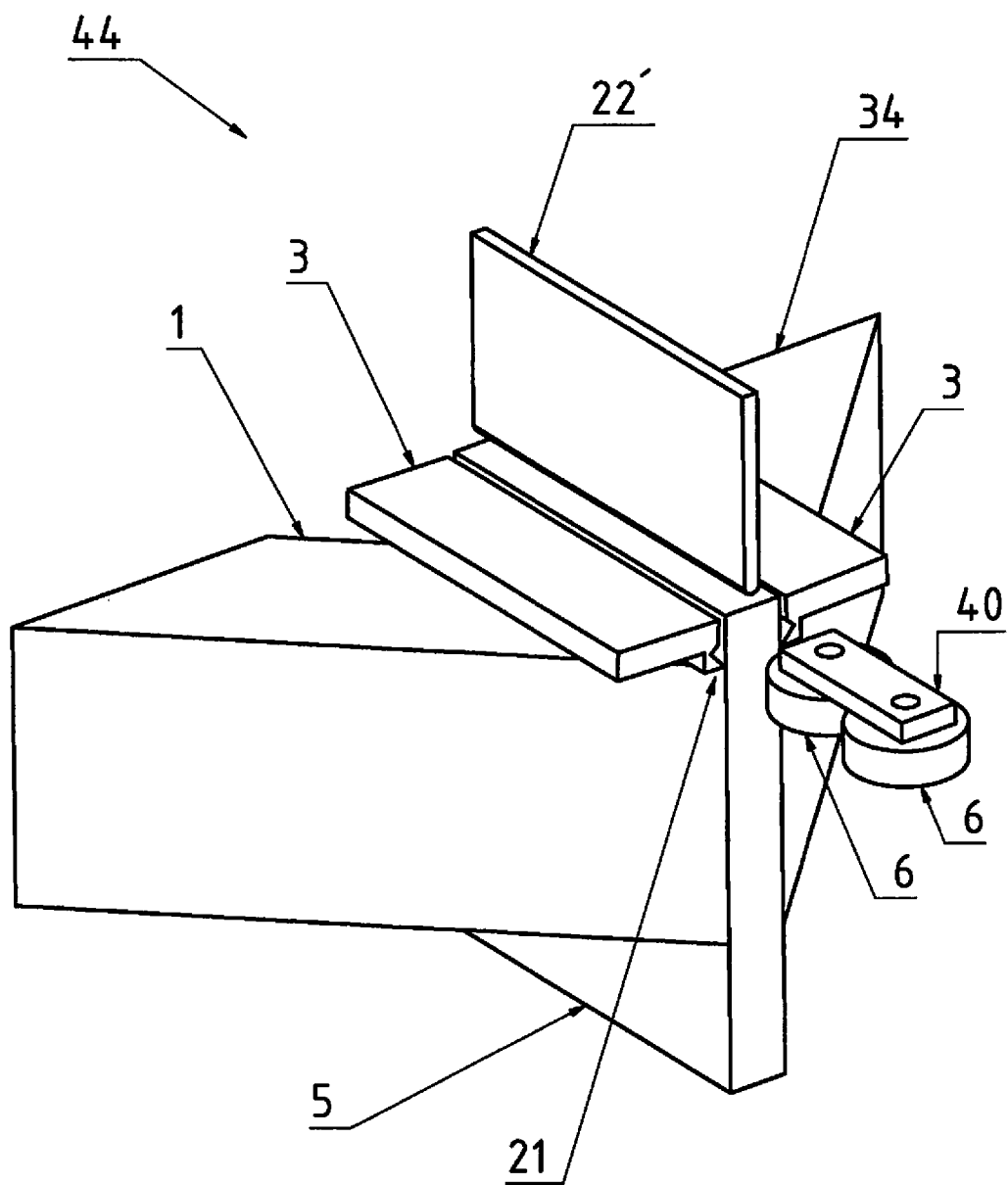
Figure 13A:
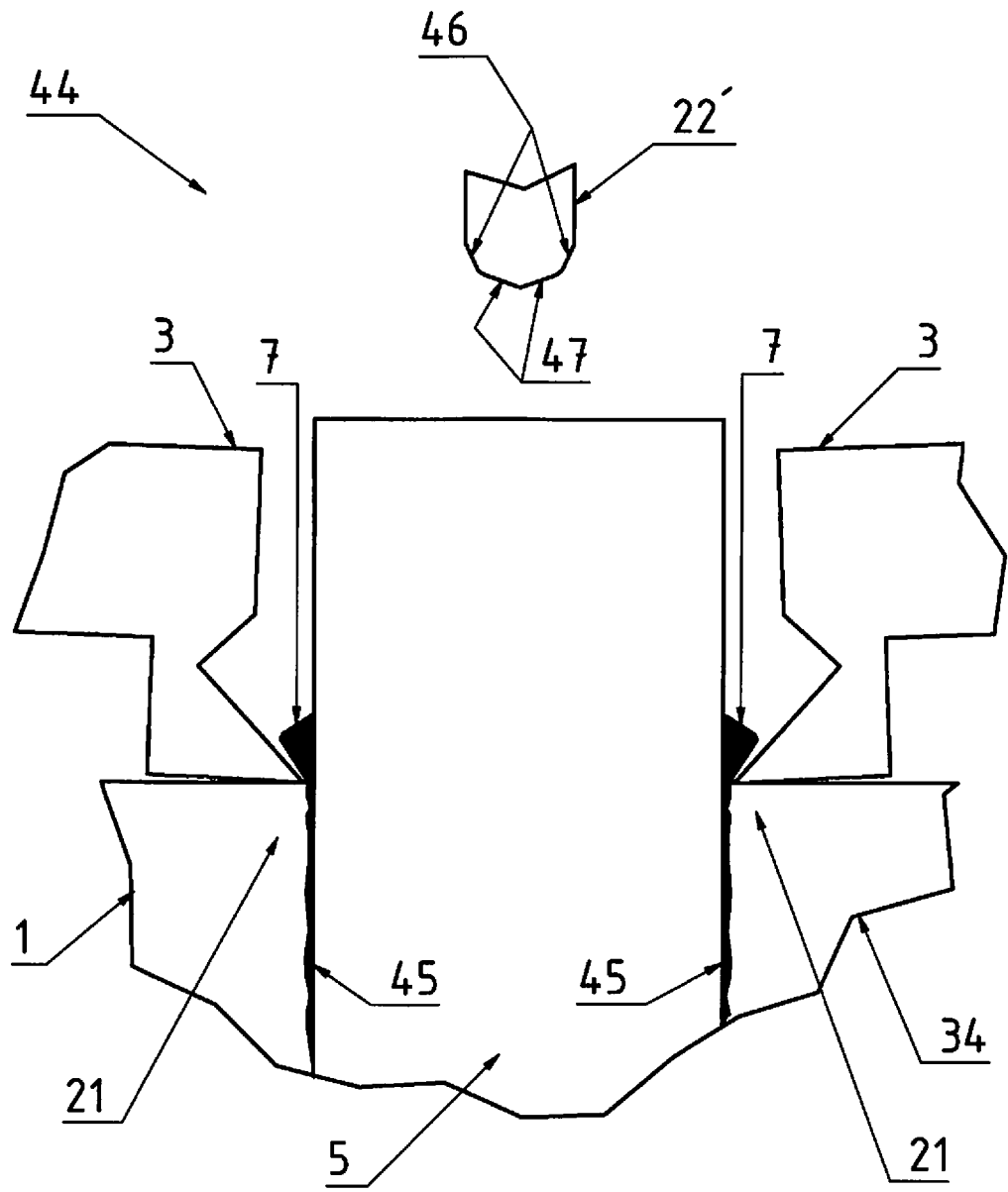
FIGS. 13a to 13e detailed views, each corresponding to FIGS. 12a to 12e.
Figure 13B:
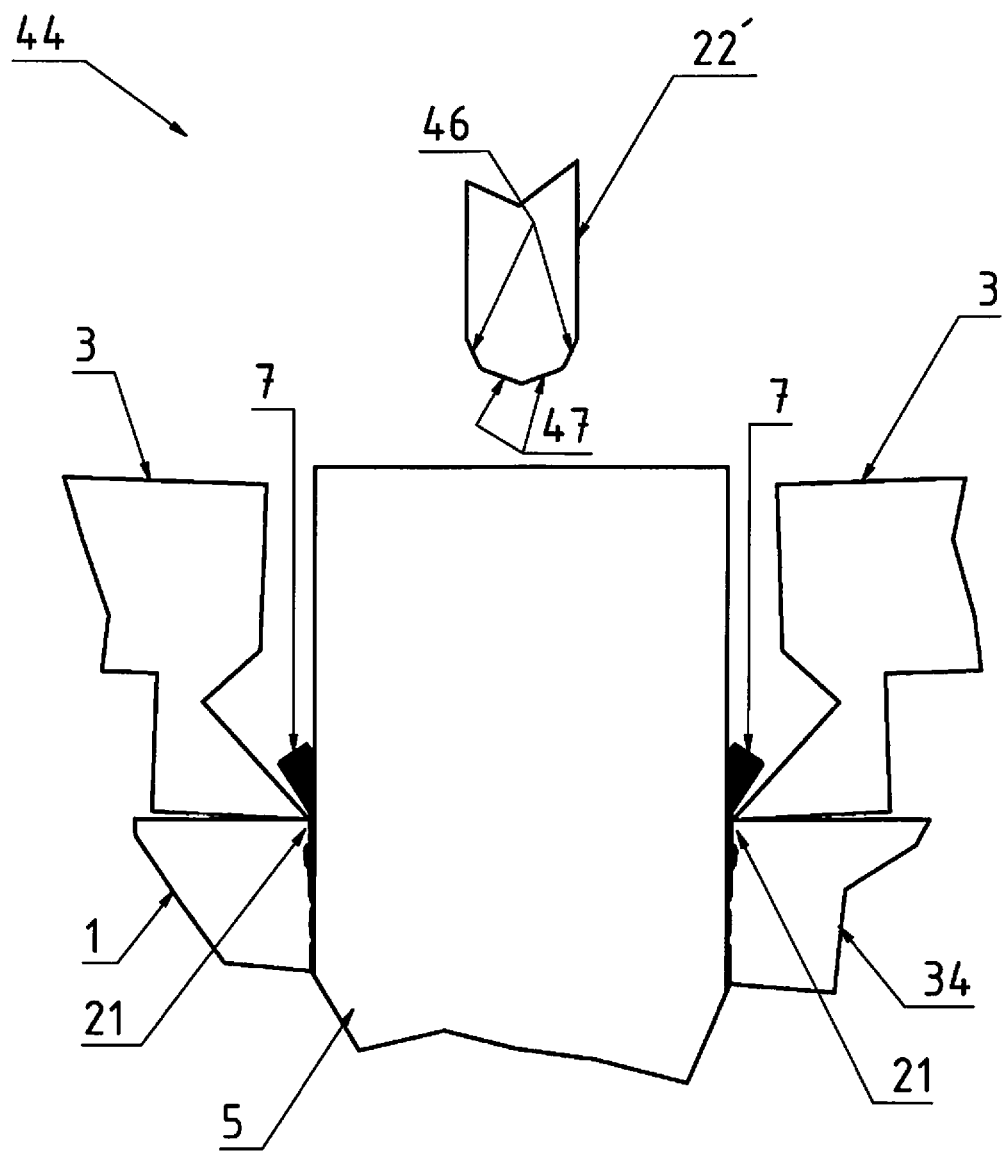

The process sequence that uses the finishing tool 22' is described in greater detail below. In this context, FIGS. 12a and 13a show the device 44 during the partial melting step with open limiting elements 3, while FIGS. 12b and 13b show the device 44 with limiting elements 3 that have been moved towards the joining face 10.

Figure 12C:
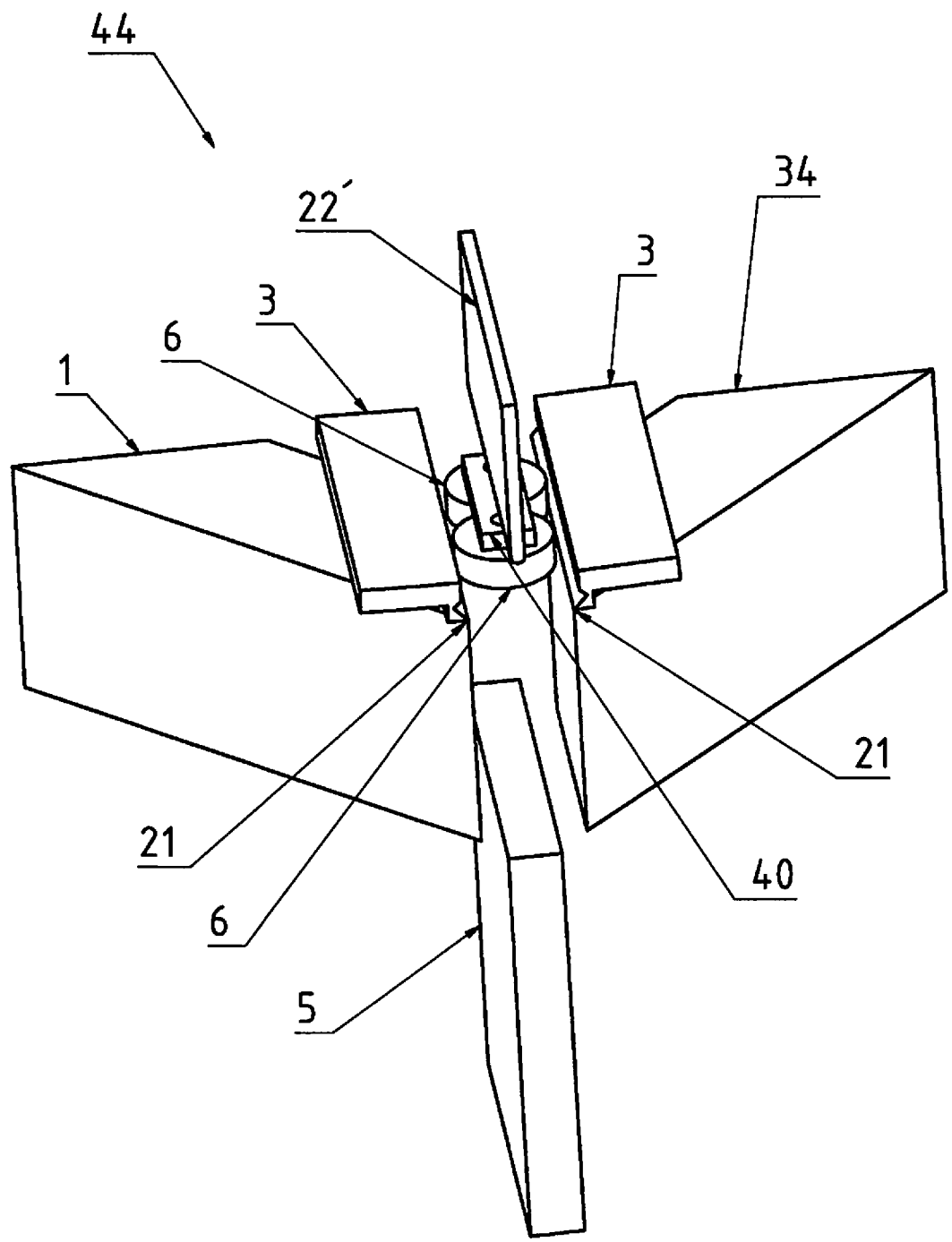
Figure 13C:
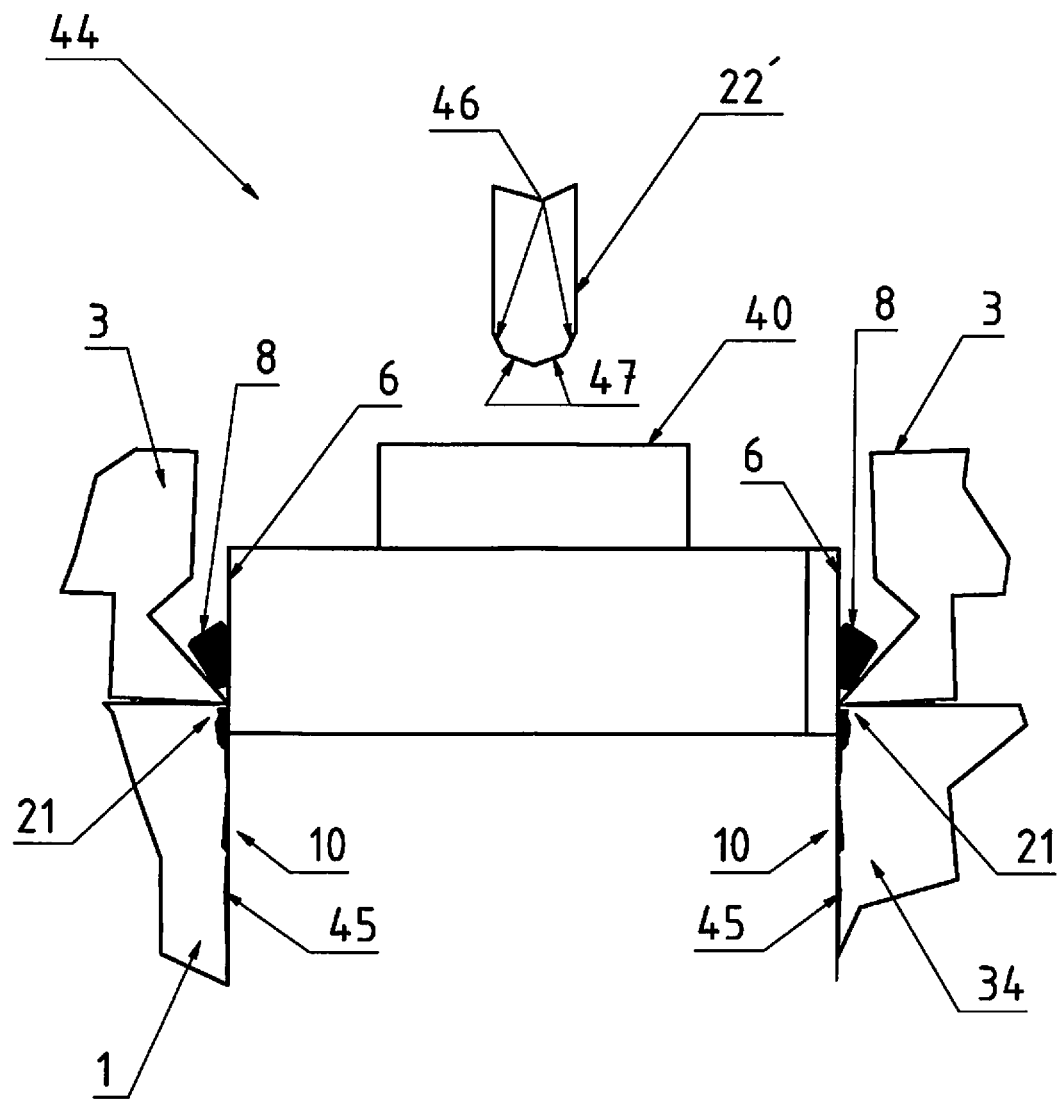

FIGS. 12c and 13c show the device 44 after the partial melting, with the profiled parts 1, 34 having been moved apart, during the processing using the counter tool 6, which is configured in the form of rollers. The rollers run along the profile edge 21 and roll off of the limiting elements 3 in order to segregate the excess melt 7 which might also contain partially melted protective film.

Figure 12D:
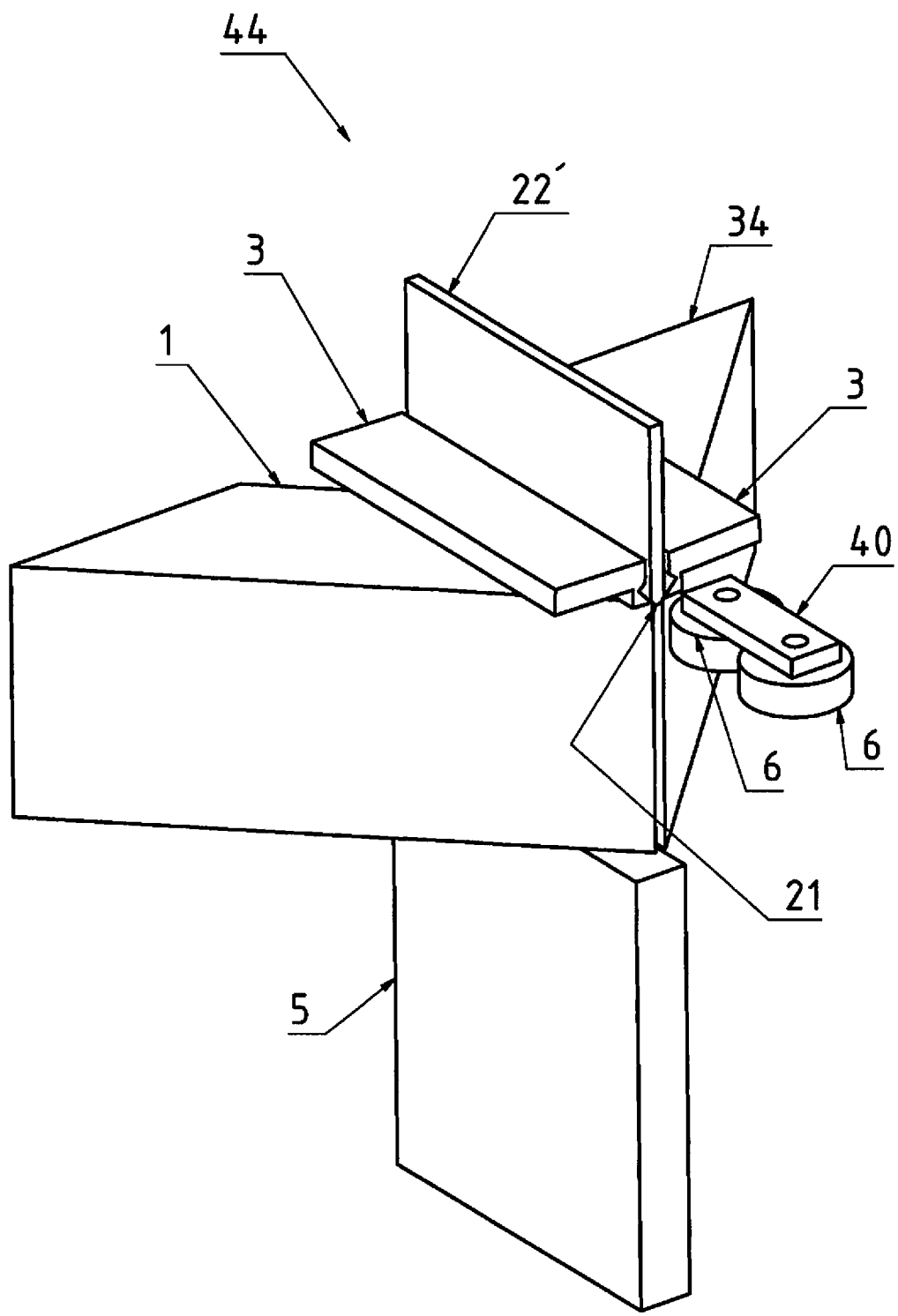
Figure 13D:
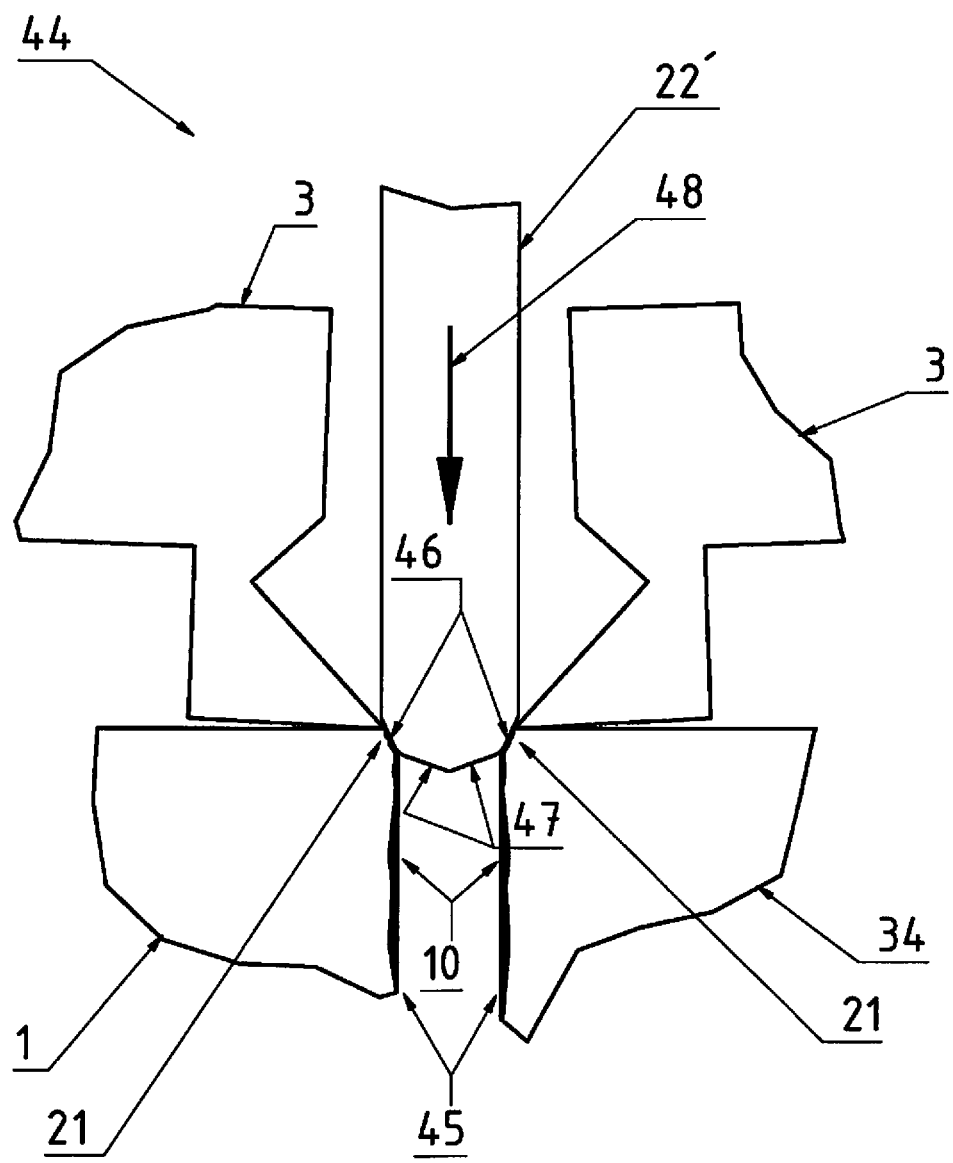

FIGS. 12d and 13d show the device 44 when the profiled parts 1 and 34 have approached each other once again. In this position, the joining faces 10 of the profiled parts 1 and 34 are still at a distance from each other. However, they are already so close to each other that the counter tool 22' that has been moved between them can use its processing faces 46 to process the profile edges 21, thus displacing the melt inwards in the direction of the joining faces 10. In this process, a direction of movement oriented inwards, that is to say, in the direction of the joining faces 10, is imparted to the melt and to the profile edges 21 that have softened under the effect of the melting heat.

Figure 12E:
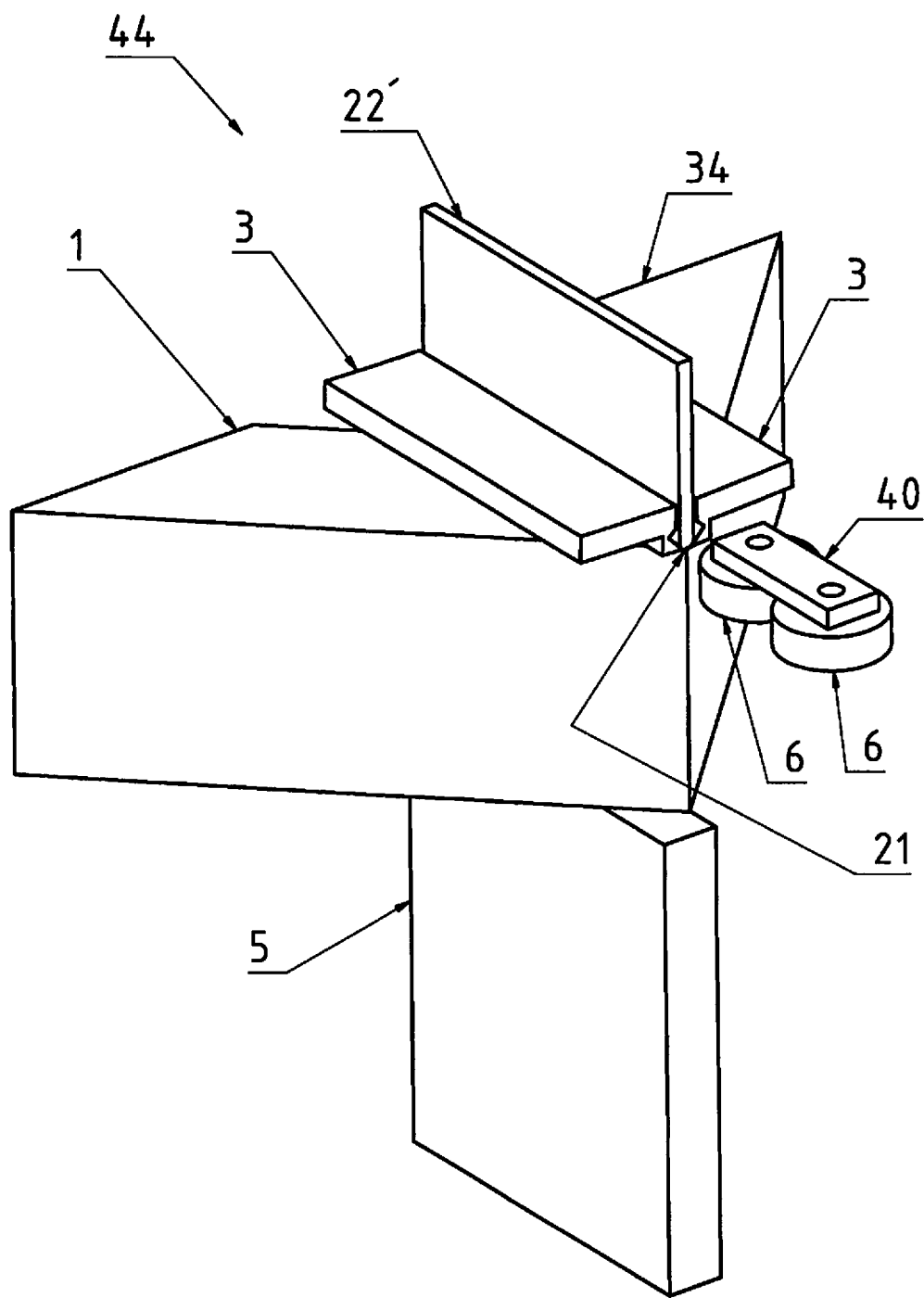
Figure 13E:
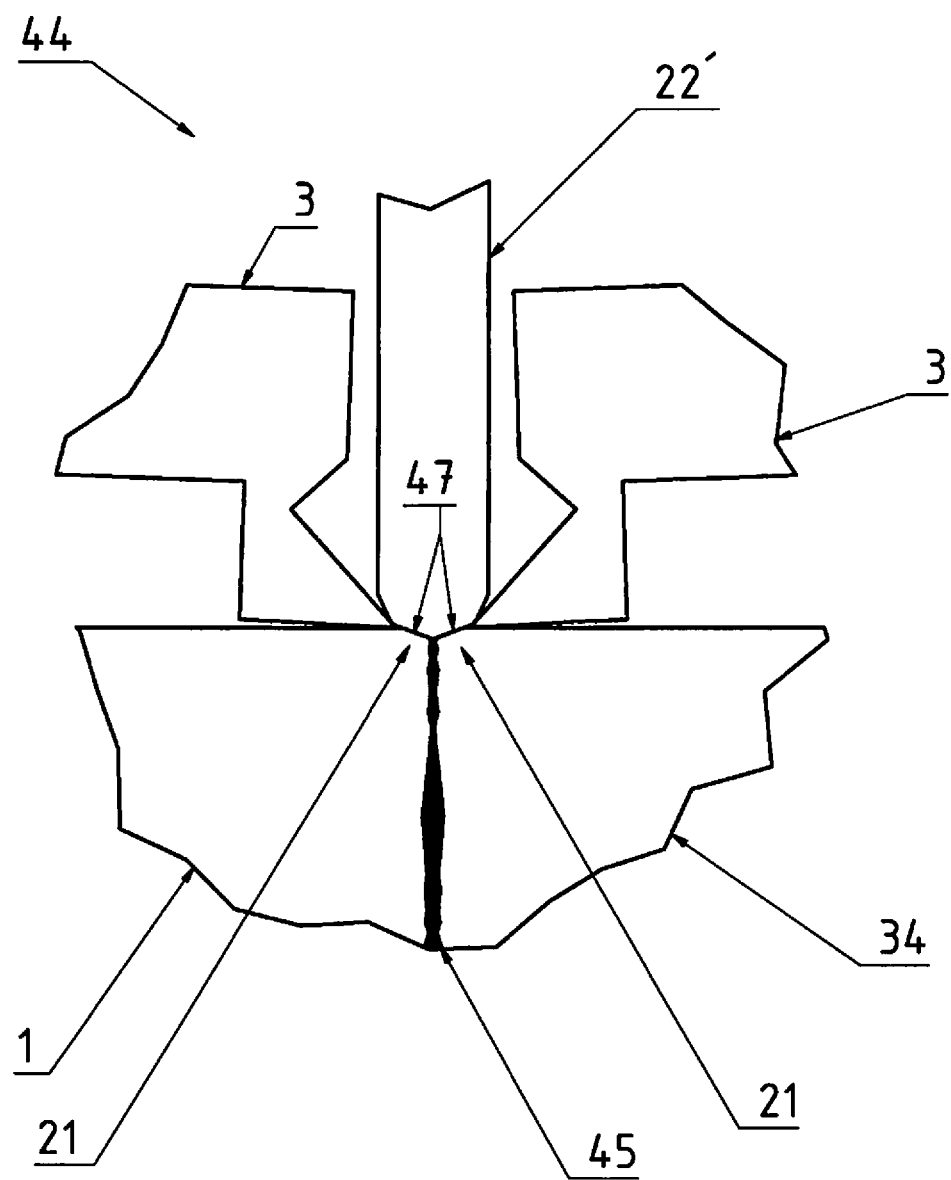

FIGS. 12e and 13e show the device 44 during the joining procedure, whereby the melts 45 provided on each of the joining faces 10 for the welding are brought into contact with each other and the profiled parts 1, 34 are compressed against each other. In this processing step, the finishing tool 22' can be retracted to a certain extent from the area between the joining faces 10, as is depicted in FIGS. 12e and 13e. The processing faces 47, however, might still come into contact with the profile edges 21 in such a way as to ensure that a V-groove is created at the welded connection.

During the joining step, after the profiled parts 1 and 34 have been compressed, the finishing tool 22' can also be used as a kind of stamp which ultimately shapes the melt in the area of the profile edges 21 and which gives them a final shape.

In this manner, finishing can take place in two stages by imparting a direction of movement 48 to the joining face and by subsequently limiting the flow or by shaping the melt in the direction of the exposed surfaces 11.

For instance, it is also conceivable to employ a processing tool of the type described, for example, in German patent application DE 10 2015 107 121 A1, and there in FIG. 6 as well as in the associated paragraph [0066] as a mold part 22. A tool known from German patent application DE 10 2016 104 785 and designated there as a mold part 4 can also be used as a finishing tool. The movement of the mold part there is depicted in the figures of German patent application DE 10 2016 104 785 A1 by a double arrow. In particular, the finishing tool can be configured as in FIG. 7 there with alternatives A, B and C, which are described in paragraph [0038] of DE 10 2016 104 785 A1.

By the same token, the counter tool 29 according to FIG. 7 and the counter tool 6, for instance, according to FIG. 1 can be combined in such a way that the counter tool executes a combined rolling and pushing movement consisting of the movement components 17 and 18.

In any case, it has been found that the segregation of the excess melt 7 that takes place before the joining step leads to considerably better results than has been possible so far with the prior-art devices. In this context, the excess melt 8 that is often formed as a single chip can be subsequently removed in a simple manner, for example, by means of suction or pressurized air.

Protective films—not shown here for the sake of simplicity—that are present on the exposed surfaces 11, can remain on the profiled part without first being processed and they hardly, or not at all, affect the esthetics and the mechanical strength of the joined connection created according to the invention.

LIST OF REFERENCE NUMERALS 1 profiled part
2 profile support
3 limiting element
4 profile stop
5 heating element
6 counter tool
7 excess melt
8 segregated excess melt
9 separating edge
10 joining face 11 exposed surface
12 functional surface
13 overlap
14 support surface (for window panes)
15 axis of rotation
16 lateral surface
17 movement component (lengthwise)
18 movement component (crosswise)
19 counter tool movement (resultant, at an angle)
20 tool distance
21 profile edge
22 finishing tool
23 profile wall
24 profile cut length
25 cutting-area line
26 melting end-point line
27 joining end-point line
28 guide
29 counter tool (alternative embodiment)
30 movement of the limiting element
31 joining plane
32 heating surface
33 stop surface
34 profiled part
35 overlap
36 undercut
37 collar
38 shoulder
39 direction
40 counter tool holder
41 adjustment means
42 processing face
43 holder
44 device
45 melt
46 processing face
47 processing face
48 direction of movement

The invention claimed is:

1. A method for connecting at least two profiled parts (1, 34) made of a thermoplastic material, comprising:
   (a) securing the at least two profiled parts (1) to profile supports (2) that can be moved relative to each other;
   (b) partially melting the at least two profiled parts (1) at their end joining faces (10) during a partial melting step employing a heating element (5);
   (c) resting a limiting element (3) with a separating edge (9) on and/or against at least one outer surface of at least one profiled part (1), wherein, during the partial melting step (b), the limiting element (3) controls and/or limits excess melt (7) at the transition of the appertaining joining face (10) from escaping towards the outer surface of the profiled part;
   (d) guiding a counter tool (6, 29) through the melt along the separating edge (9) of the limiting element (3) in order to segregate the excess melt (7) that has escaped over the separating edge (9); and
   (e) after the heating element (5) has been removed, pressing together the partially melted joining faces (10) of the profiled parts until the partially melted joining faces have solidified to form a welded connection.

2. The method according to claim 1, wherein the counter tool (6, 29) executes a rolling movement.

3. The method according to claim 1, wherein the counter tool (6, 29) is brought into contact with the separating edge (9), at least in certain sections, during the segregation of the excess melt (7).

4. The method according to claim 3, wherein the counter tool (6, 29) is spring-loaded.

5. The method according to claim 1, wherein the limiting element (3) is moved in the plane of the outer surface of the profiled part (1) on which the limiting element rests, relative to the joining face (10) into at least two positions, so that the limiting element (3) is in an advanced position during the segregation step, and is in a retracted position during the joining step, or vice versa.

6. The method according to claim 1, wherein the counter tool (6, 29) is guided towards the separating edge (9) at a prescribed tool distance (20) of less than 0.5 mm.

7. The method according to claim 1, wherein the counter tool (6, 29) is configured in the form of a blade and pushes in a first direction (17) running along the separating edge (9) and in a second direction (18) that runs crosswise thereto, with the result that the counter tool (6, 29) moves in a third direction (19) that runs at an angle relative to the separating edge (9).

8. The method according to claim 1, wherein the profile edge (21) of the profiled part that limits the joining face (10) towards the outside is shaped at least in some sections inwards in the direction of the joining face (10) by means of the counter tool (6, 29) or by means of a separately movable finishing tool (22, 22').

9. The method according to claim 7, wherein segregation of the excess melt (7) in step (d) is followed by a finishing step employing a finishing tool (22, 22') during which the profile edge (21) is shaped.

10. The method according to claim 8, wherein the finishing tool (22') processes both profiled parts (1, 34) at the same time.

11. The method according to claim 8, wherein the appertaining profile edge (21) of the profiled parts (1, 34) is shaped by the finishing tool (22') prior to the joining step (e), and the joining line resulting from the weld seam is imparted with a shape during or after completion of the joining step.

12. The method according to claim 11, wherein in a first processing stage, the profile edge (21) of the profiled parts (1, 34) is shaped by means of the finishing tool (22') prior to the joining step (e), and, in a second processing stage, which takes place during or after completion of the joining step (e), the joining line resulting from the weld seam is given a shape by means of the finishing tool (22').

13. The method according to claim 8, wherein the finishing tool (22') limits the flow of melt in the direction of the exposed surface (11) during the joining step (e).

14. The method according to claim 8, wherein the profile edge (21) is shaped together with the movement of the counter tool along the separating edge (9).

15. A device for connecting at least two profiled parts (1, 34) made of a thermoplastic material, comprising:
   at least two profile supports (2) that can be moved relative to each other and configured to secure the at least two profiled parts (1, 34),
   a heating element (5) insertable between the profile supports (2) for purposes of partially melting respective ends of the at least two secured profiled parts (1) at their joining faces (1),
   at least one limiting element (3) that rests on or against at least one outer surface of at least one profiled part (1, 34) that is configured for contacting at least one exposed surface (11) and/or at least one functional surface (12) of the profiled parts (1), said limiting element (3) being configured with a separating edge (9) that serves to control and/or limit the escape of excess melt (7) towards the outer surface of the profiled part (1) at the transition site to the corresponding joining face (10), and a counter tool (6, 29) for segregating the excess melt (7) that has escaped over the separating edge (9), wherein said counter tool is movable along the separating edge (9) and through the melt.

16. The device according to claim 15, wherein the counter tool (6, 29) is rotatable or swivelable relative to the separating edge (9).

17. The device according to claim 16, wherein the counter tool (6, 29) has a processing face that is contoured.

18. The device according to claim 15, further comprising a finishing tool (22, 22') for processing the profile edge (21) of the at least one profiled part (1), wherein the finishing tool (22, 22') is configured as a roller or as a strip or as a rocker, and wherein the roller, strip or rocker has a V-shaped embossed contour.

19. The device according to claim 18, wherein, in order to shape the profile edge (21), the movements of the heating element (5) and/or of the counter tool (6, 29) and/or of a finishing tool (22, 22') are at least partially coupled together.

20. The device according to claim 18, wherein the finishing tool (22') is configured to simultaneously process the two profiled parts (1, 34) that are to be joined to each other.

21. The device according to claim 18, wherein the finishing tool (22') has a processing face (46) that can be brought into contact with the profiled part (1, 34) and that, at least in certain sections, runs at an angle greater than 0° relative to the joining face (10).

22. The device according to claim 21, wherein the finishing tool (22') has at least a second processing face (47) that adjoins the first processing face (46) and that runs at a different angle relative to the joining face (10).

23. The device according to claim 15, wherein the limiting element (3) and/or the separating edge (9) and/or the counter tool (6, 29) can warmed up or cooled down to various temperatures.

24. The device according to claim 15, further comprising a height adjustment mechanism (41) configured to set different profile thicknesses and/or to set a tool overlap (35) between the counter tool (6, 29) and the joining face (10) of the profiled part (1).

25. The device according to claim 24, wherein the height adjustment mechanism (41) is configured for a rough and/or fine adjustment of the profile thickness, wherein the rough adjustment is in the form of millimeter increments while the fine adjustment is in the form of increments of tenths of a millimeter.

26. The device according to claim 15, wherein the counter tool (6, 29) can be set at a setting angle ($\alpha$) relative to the plane of the joining face (10).

* * * * *

(12) EX PARTE REEXAMINATION CERTIFICATE (12678th)
United States Patent
Daun

(10) Number: US 11,629,547 C1
(45) Certificate Issued: Aug. 16, 2024

(54) DEVICE AND METHOD FOR CONNECTING PROFILED PARTS

(71) Applicant: Rotox Besitz—und Verwaltungsgesellschaft MbH, Brechen (DE)

(72) Inventor: Winfried Daun, Grenderich (DE)

(73) Assignee: ROTOX HOLDING GMBH & CO. KG, Brechen (DE)

Reexamination Request:
No. 90/015,316, Oct. 24, 2023

Reexamination Certificate for:
Patent No.: 11,629,547
Issued: Apr. 18, 2023
Appl. No.: 16/764,205
PCT Filed: Nov. 21, 2018
PCT No.: PCT/EP2018/082060
§ 371 (c)(1),
(2) Date: May 14, 2020
PCT Pub. No.: WO2019/101787
PCT Pub. Date: May 31, 2019

(30) Foreign Application Priority Data

Nov. 21, 2017 (DE) .......................... 102017127483.9

(51) Int. Cl.
| | |
|---|---|
| E06B 3/00 | (2006.01) |
| B29C 65/00 | (2006.01) |
| B29C 65/18 | (2006.01) |
| B29C 65/20 | (2006.01) |
| B29C 65/78 | (2006.01) |
| E06B 3/22 | (2006.01) |
| E06B 3/96 | (2006.01) |
| B29K 27/06 | (2006.01) |
| B29L 31/00 | (2006.01) |

(52) U.S. Cl.
CPC ............ *E06B 3/9608* (2013.01); *B29C 65/18* (2013.01); *B29C 65/20* (2013.01); *B29C 65/7835* (2013.01); *B29C 66/1162* (2013.01); *B29C 66/324* (2013.01); *B29C 66/326* (2013.01); *B29C 66/5243* (2013.01); *B29C 66/71* (2013.01); *B29C 66/723* (2013.01); *B29C 66/72523* (2013.01); *B29C 66/73921* (2013.01); *B29C 66/8416* (2013.01); *B29C 66/91423* (2013.01); *E06B 3/22* (2013.01); *B29C 2795/002* (2013.01); *B29K 2027/06* (2013.01); *B29L 2031/005* (2013.01)

(58) Field of Classification Search
None
See application file for complete search history.

(56) References Cited

To view the complete listing of prior art documents cited during the proceeding for Reexamination Control Number 90/015,316, please refer to the USPTO's Patent Electronic System.

*Primary Examiner* — Elizabeth L McKane

(57) ABSTRACT

At least two profiled parts (1) are fixed to profile supports (2) that can be moved relative to each other. The profiled parts (1) are each partially melted at an end joining face (10) with a heating element (5) in a melting step and, after the heating element (5) has been removed, the partially melted joining faces (10) of the profiled parts are pressed against each other in a joining step, until the molten materials brought into contact with each other there cool down and solidify, forming a welded connection. To avoid or reduce occurrence or development of a welding bead, in a separating step that is carried out before the joining step, a mating tool (6, 29) is guided through the melt along the separating edge (9) of the limiting element (3), in order to separate the excess melt (7) that has escaped over the separating edge (9).

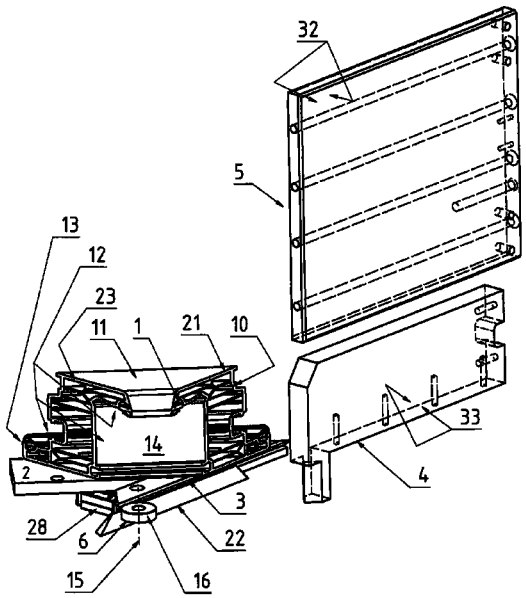

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3, 4, 6-8, 15-17, 19, 23, 24 and 26 are determined to be patentable as amended.

Claims 5, 9, 10-14, 18, 20-22 and 25, dependent on an amended claim, are determined to be patentable.

New claim 27 is added and determined to be patentable.

1. A method for connecting at least two profiled parts (1, 34) made of a thermoplastic material, comprising:
    (a) securing the at least two profiled parts (1) to profile supports (2) that can be moved relative to each other;
    (b) partially melting the at least two profiled parts (1) at their end joining faces (10) during a partial melting step employing a heating element (5);
    (c) resting a limiting element (3) with a separating edge (9) on and/or against at least one outer surface of at least one profiled part (1), wherein, during the partial melting step (b), the limiting element (3) controls and/or limits excess melt (7) at the transition of the appertaining joining face (10) from escaping towards the outer surface of the profiled part;
    (d) guiding a *roller surface of a* counter tool (6 [, 29]) through the melt along the separating edge (9) of the limiting element (3) in order to segregate the excess melt (7) that has escaped over the separating edge (9); and
    (e) after the heating element (5) has been removed, pressing together the partially melted joining faces (10) of the profiled parts until the partially melted joining faces have solidified to form a welded connection.

3. The method according to claim 1, wherein the counter tool (6 [, 29]) is brought into contact with the separating edge (9), at least in certain sections, during the segregation of the excess melt (7).

4. The method according to claim 3, wherein the counter tool (6 [, 29]) is spring-loaded.

6. The method according to claim 1, wherein the counter tool (6 [, 29]) is guided towards the separating edge (9) at a prescribed tool distance (20) of less than 0.5 mm.

7. The method according to claim 1, wherein the counter tool (6 [, 29]) [is configured in the form of a blade and]0 pushes in a first direction (17) running along the separating edge (9) and in a second direction (18) that runs crosswise thereto, with the result that the counter tool (6 [, 29]) moves in a third direction (19) that runs at an angle relative to the separating edge (9).

8. The method according to claim 1, wherein the profile edge (21) of the profiled part that limits the joining face (10) towards the outside is shaped at least in some sections inwards in the direction of the joining face (10) by means of the counter tool (6 [, 29]) or by means of a separately movable finishing tool (22, 22').

15. A device for connecting at least two profiled parts (1, 34) made of a thermoplastic material, comprising:
    at least two profile supports (2) that can be moved relative to each other and configured to secure the at least two profiled parts (1, 34),
    a heating element (5) insertable between the profile supports (2) for purposes of partially melting respective ends of the at least two secured profiled parts (1) at their joining faces (1),
    at least one limiting element (3) that rests on or against at least one outer surface of at least one profiled part (1, 34) that is configured for contacting at least one exposed surface (11) and/or at least one functional surface (12) of the profiled parts (1), said limiting element (3) being configured with a separating edge (9) that serves to control and/or limit the escape of excess melt (7) towards the outer surface of the profiled part (1) at the transition site to the corresponding joining face (10), and
    a counter tool (6 [, 29]) *with a roller surface* for segregating the excess melt (7) that has escaped over the separating edge (9),
    wherein said counter tool is movable along the separating edge (9) and through the melt.

16. The device according to claim 15, wherein the counter tool (6 [, 29]) is rotatable or swivelable relative to the separating edge (9).

17. The device according to claim 16, wherein the counter tool (6 [, 29]) has a processing face that is contoured.

19. The device according to claim 18, wherein, in order to shape the profile edge (21), the movements of the heating element (5) and/or of the counter tool (6 [, 29]) and/or of a finishing tool (22, 22') are at least partially coupled together.

23. The device according to claim 15, wherein the limiting element (3) and/or the separating edge (9) and/or the counter tool (6 [, 29]) can warmed up or cooled down to various temperatures.

24. The device according to claim 15, further comprising a height adjustment mechanism (41) configured to set different profile thicknesses and/or to set a tool overlap (35) between the counter tool (6 [, 29]) and the joining face (10) of the profiled part (1).

26. The device according to claim 15, wherein the counter tool (6 [, 29]) can be set at a setting angle (α) relative to the plane of the joining face (10).

27. *A method for connecting at least two profiled parts made of a thermoplastic material, comprising:*
    (a) *securing the at least two profiled parts to profile supports that can be moved relative to each other;*
    (b) *partially melting the at least two profiled parts at their end joining faces during a partial melting step employing a heating element;*
    (c) *resting a limiting element with a separating edge on and/or against at least one outer surface of at least one profiled part, wherein, during the partial melting step (b), the limiting element controls and/or limits excess melt at the transition of the appertaining joining face from escaping towards the outer surface of the profiled part;*
    (d) *guiding a counter tool by a rolling movement through the melt along the separating edge of the limiting element in order to segregate the excess melt that has escaped over the separating edge; and*
    (e) *after the heating element has been removed, pressing together the partially melted joining faces of the pro-*

*filed parts until the partially melted joining faces have solidified to form a welded connection.*

\* \* \* \* \*